United States Patent
Freeman et al.

(10) Patent No.: US 11,742,964 B2
(45) Date of Patent: Aug. 29, 2023

(54) LOCATION SENSING TECHNOLOGY FOR DETECTING ASSET LOCATION

(71) Applicant: United Parcel Service of America, Inc., Atlanta, GA (US)

(72) Inventors: Mallory Freeman, Atlanta, GA (US); Timothy Major, Atlanta, GA (US); Matthew Britton, Atlanta, GA (US); Lauren Skorb, Atlanta, GA (US)

(73) Assignee: United Parcel Services of America, Inc., Atlanta, GA (US)

( * ) Notice: Subject to any disclaimer, the term of this patent is extended or adjusted under 35 U.S.C. 154(b) by 149 days.

(21) Appl. No.: 17/137,608

(22) Filed: Dec. 30, 2020

(65) Prior Publication Data
US 2022/0207473 A1    Jun. 30, 2022

(51) Int. Cl.
*H04B 17/318*    (2015.01)
*G06K 7/10*    (2006.01)

(52) U.S. Cl.
CPC ....... *H04B 17/318* (2015.01); *G06K 7/10099* (2013.01); *G06K 7/10188* (2013.01); *G06K 7/10356* (2013.01)

(58) Field of Classification Search
None
See application file for complete search history.

(56) References Cited

U.S. PATENT DOCUMENTS

| 10,410,176 B2 | 9/2019 | Borders et al. |
| 2008/0266092 A1 | 10/2008 | Campero et al. |
| 2018/0247259 A1* | 8/2018 | Borders ............... H04W 4/029 |
| 2019/0124475 A1 | 4/2019 | Swart |

OTHER PUBLICATIONS

International Search Report and Written Opinion for PCT application No. PCT/US2021/065480, dated Apr. 5, 2022, 13 pages.

* cited by examiner

*Primary Examiner* — Thomas S McCormack
(74) *Attorney, Agent, or Firm* — Shook, Hardy & Bacon, L.L.P.

(57) ABSTRACT

Various embodiments employ multiple readers and tags in fixed locations in different geographical areas and/or along different storage units. This allows for more granular or precise location sensing. Particular embodiments employ multiple environment tags in various geographical locations and within multiple storage units. Using this new infrastructure setup, some embodiments can perform new functionality by predicting whether a target asset is in a particular geographical location, predict whether the asset is within a particular storage unit based on the proportion of readers mapped to that shelf which are actually reading the tag on the asset, and/or can predict where an asset's exact location in the located storage unit is based on comparing indications of signal strength values between each reader and tag in the storage unit with other indications of signal strength values between each reader and the tag that is attached to the asset.

20 Claims, 9 Drawing Sheets

| READER ID | ENVIRONMENT TAGS | STORAGE UNIT ID |
|---|---|---|
| 1 | A, B, C | 1 |
| 1 | D, E, F | 1 |
| 1 | G, H, I | 1 |
| 2 | J, K | 2 |
| 2 | L, M | 3 |
| 3 | N, O, P | 4 |

| READER ID | ROOM ID |
|---|---|
| 1 | 1 |
| 2 | 1 |
| 3 | 1 |
| 4 | 2 |
| 5 | 2 |
| 6 | 2 |
| 7 | 3 |
| 8 | 3 |

LOCATION SENSING TECHNOLOGY FOR DETECTING ASSET LOCATION

BACKGROUND

The proliferation of wireless technologies, mobile computing devices, apps, and the Internet has fostered a growing interest in location-aware technologies. These technologies can locate objects using techniques such as Global Position System (GPS) triangulation or the like. Typical location-sensing technologies include static components or are limited in functionality. This can cause, among other things, inaccurate location prediction of assets (e.g., parcels, containers, or other items). As described in more detail herein, aspects improve these technologies and conventional solutions.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter. Further, alternative or additional embodiments exist other than those described in this summary section.

Some embodiments are directed to a computer-implemented method that comprises the following operations. An indication that one or more reader devices have received or read data from a target tag that is coupled to a target asset is received. The one or more reader devices and the target tag are located in a facility. A second indication that a plurality of environment tags have provided other data to the one or more reader devices is received. A first set of environment tags of the plurality of environment tags are coupled to a first storage unit within the facility. A second set of environment tags of the plurality of environment tags are coupled to a second storage unit within the facility. It is predicted that the target asset is within the first storage unit based at least in part on at least one reader device, of the one or more reader devices, mapped to the first storage unit having received or read the data from the target tag. A specific location within the first storage unit that the target asset is within is predicted based at least in part on comparing one or more indications of signal strength values between the at least one reader device and each tag of the first set of environment tags with one or more other indications of signal strength values between the at least one reader device and the target tag.

Some embodiments are directed a system that includes a plurality of reader devices that are configured to receive or read data from one or more tags. The plurality of reader devices are located in a facility. The system further includes a plurality of environment tags that are configured to provide data to at least one reader device of the plurality of reader devices. A first set of environment tags of the plurality of environment tags are coupled to a first storage unit within the facility. A second set of environment tags of the plurality of environment tags are coupled to a second storage unit within the facility. The system further includes a target tag coupled to a target asset that is located in the facility. The system further includes one or more computing devices that are configured to perform the following operations. A geographical area that the target asset is located in within the facility is predicted based at least in part on an identification of a set of reader devices, of the plurality of reader devices, receiving or reading first data from the target tag. It is predicted that the target asset is within the first storage unit based at least in part on at least one reader device, mapped to the first storage unit, receiving or reading the first data from the target tag. A specific location within the first storage unit that the target asset is within is predicted based at least in part on comparing one or more indications of signal strength values between the at least one reader device and each environment tag of the first set of environment tags with one or more other indications of signal strength values between the at least one reader device and the target tag.

Some embodiments are directed to a computer storage media having computer-executable instructions embodied thereon that, when executed, by a processor, causes the processor to perform a method. In some aspects, the method includes the following operations. One or more mappings are generated that indicate: which set of reader devices of a plurality of reader devices are assigned to one or more storage units of a plurality of storage units within a facility, what set of environment tags of a plurality of environment tags are coupled to the one or more storage units, and a positioning of each environment tag within each storage unit of the one or more storage units. It is predicted that a target asset is within a first storage unit based at least in part on a portion of the one or more mappings and further based at least in part on at least one reader device, of the plurality of reader devices, having received or read the data from a target tag. A specific location within the first storage unit that the target asset is within is predicted based at least in part on another portion of the one or more mappings and further based at least in part on comparing one or more indications of signal strength values between the at least one reader device and at least one environment tag within the first storage unit with one or more other indications of signal strength values between the at least one reader device and the target tag.

BRIEF DESCRIPTION OF THE DRAWINGS

Figure 1:
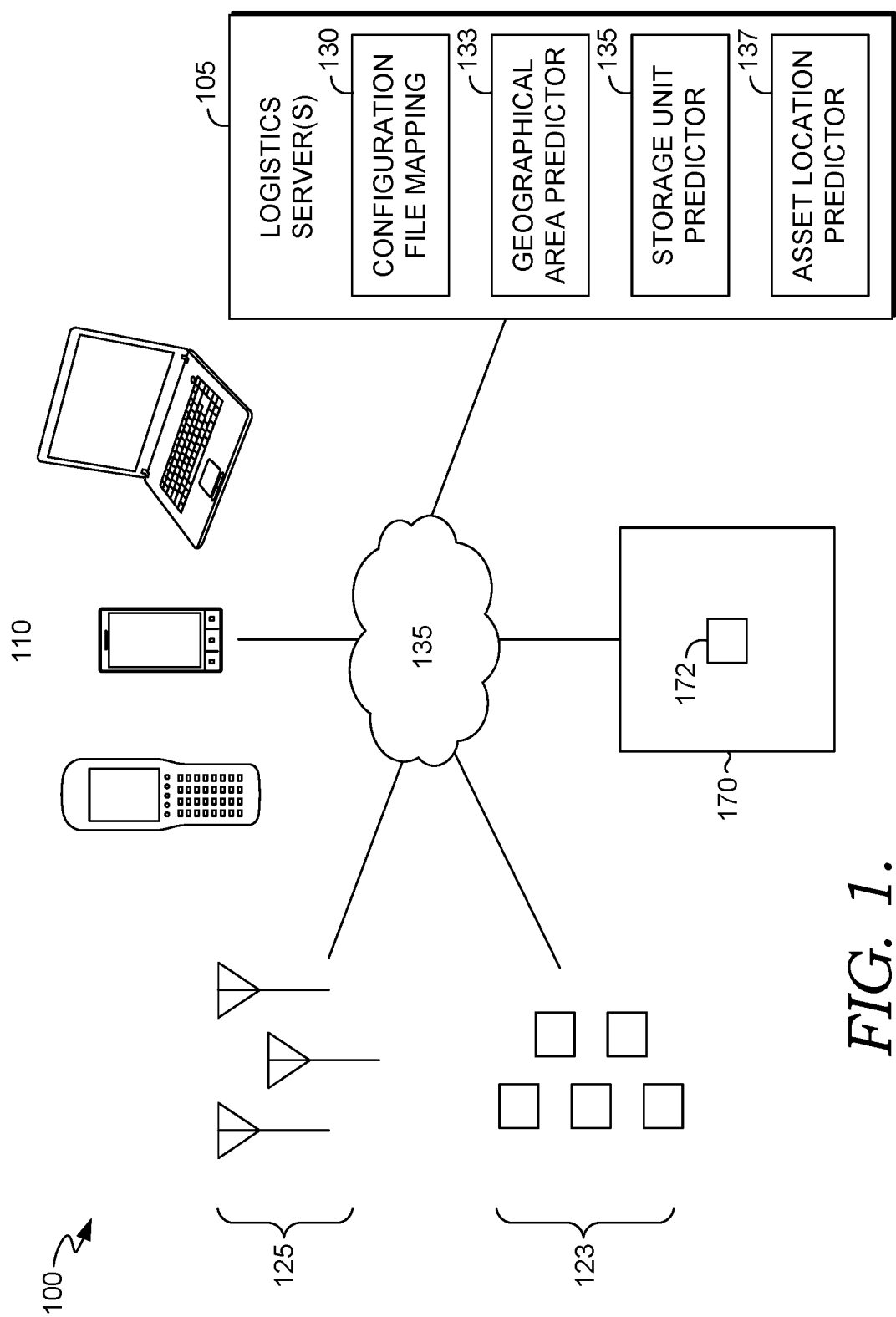

Having thus described the disclosure in general terms, reference will now be made to the accompanying drawings, which are not necessarily drawn to scale, and wherein:

FIG. 1 is a schematic diagram of an example computing environment in which aspects of the present disclosure are employed in, according to some embodiments.

Figure 2:
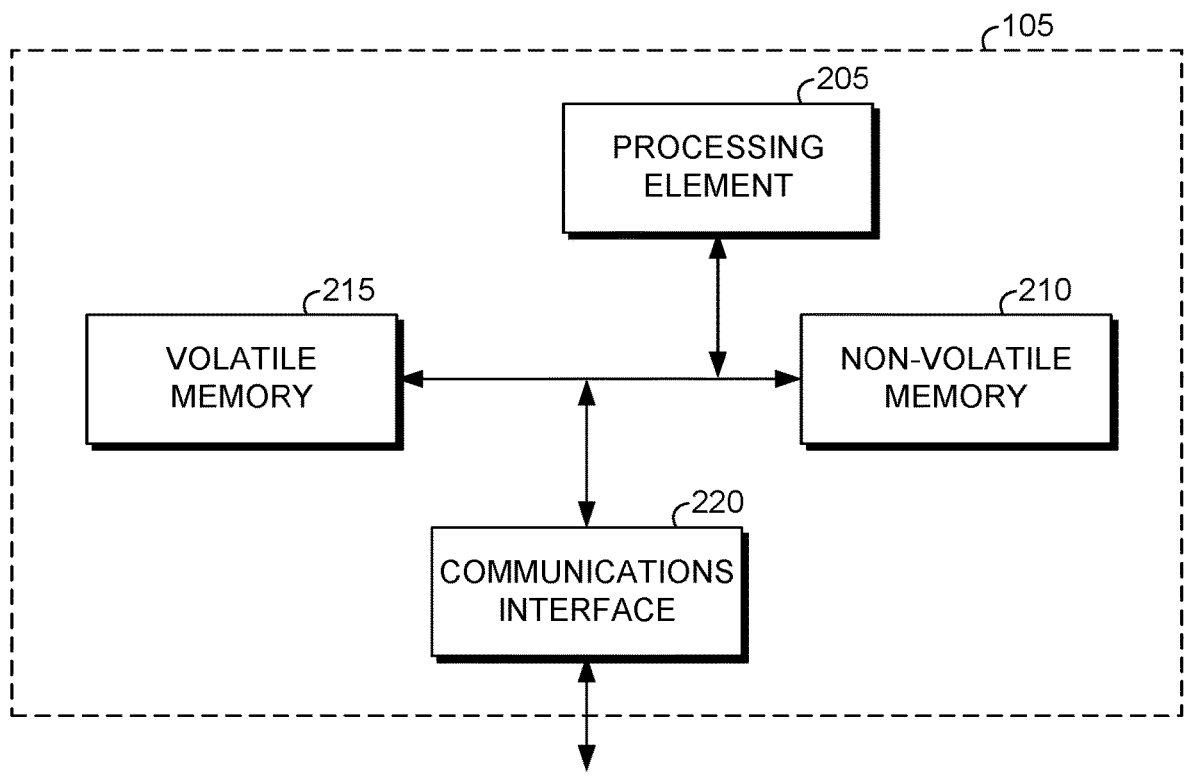

FIG. 2 is a schematic diagram of one or more logistics server(s) in which aspects of the present disclosure are employed in, according to some embodiments.

Figure 3:
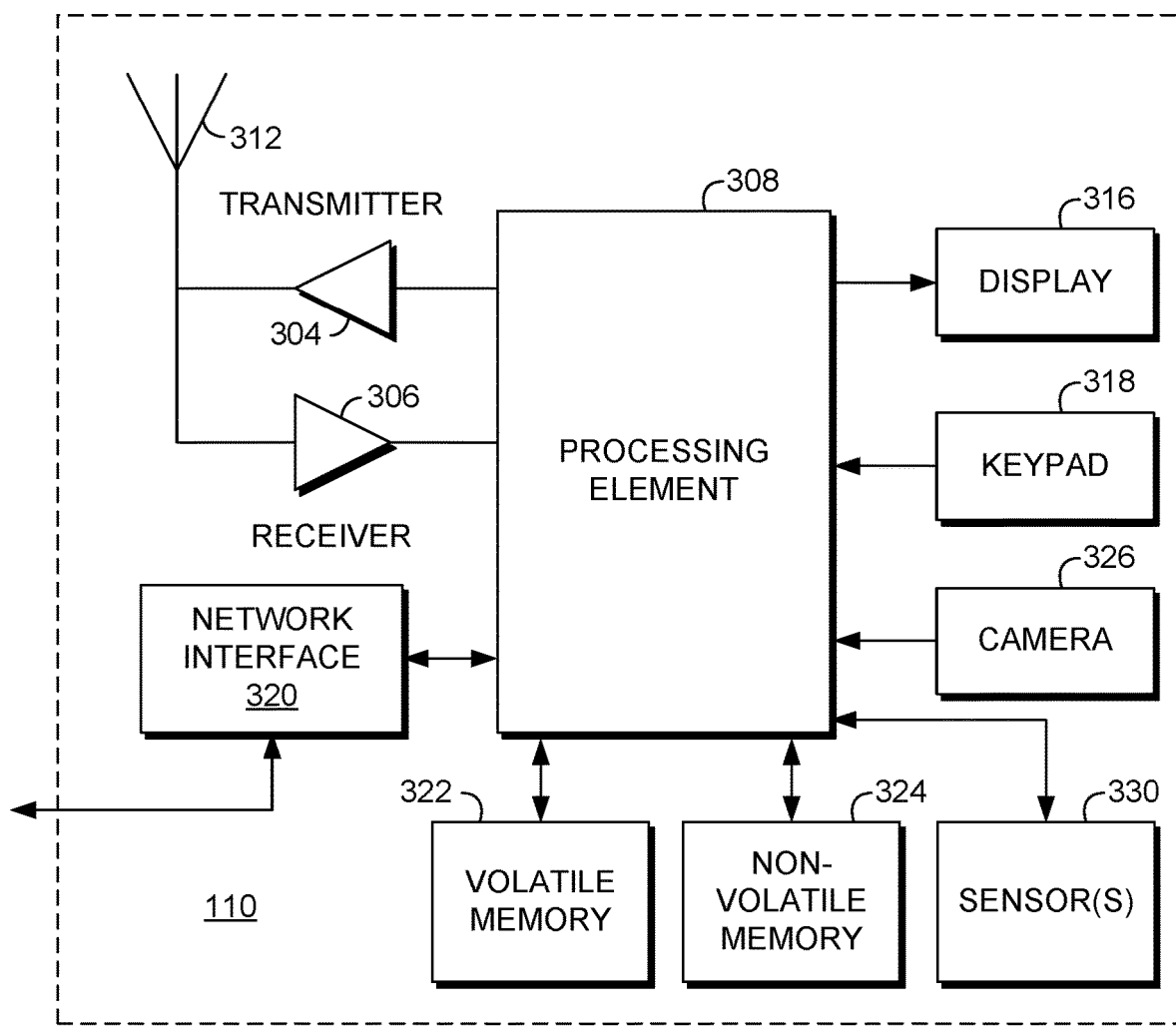

FIG. 3 is a schematic diagram of a computing entity in which aspects of the present disclosure are employed in, according to some embodiments.

Figure 4:
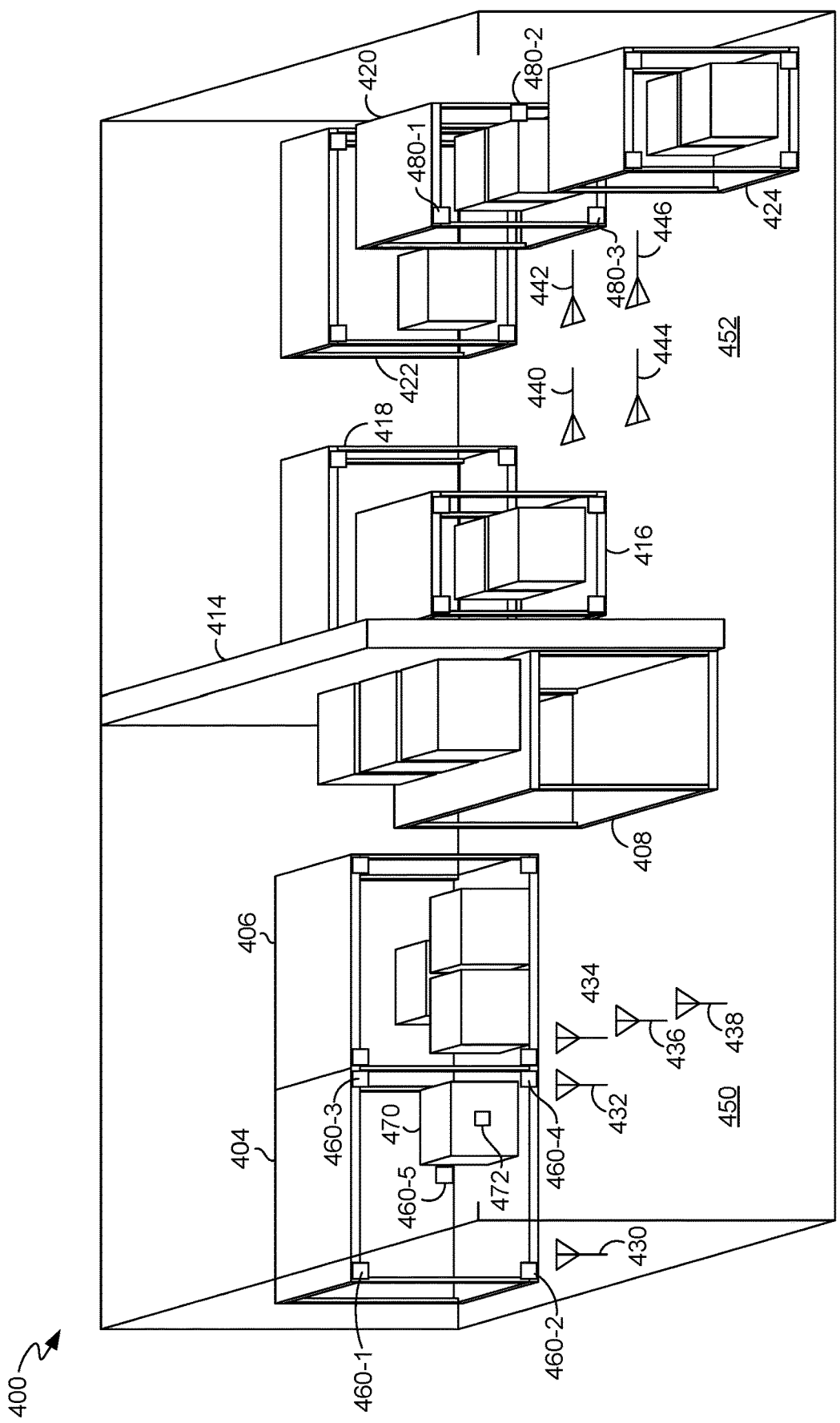

FIG. 4 is a schematic diagram depicting a top view of a building, which illustrates location sensing technology infrastructure, according to some embodiments.

FIG. 5 is a diagram of a room mapping that maps each reader device to a room, according to some embodiments.

FIG. 6 is a diagram of a storage unit mapping that maps each reader device to one or more tags and a storage unit, according to some embodiments.

Figure 7A:
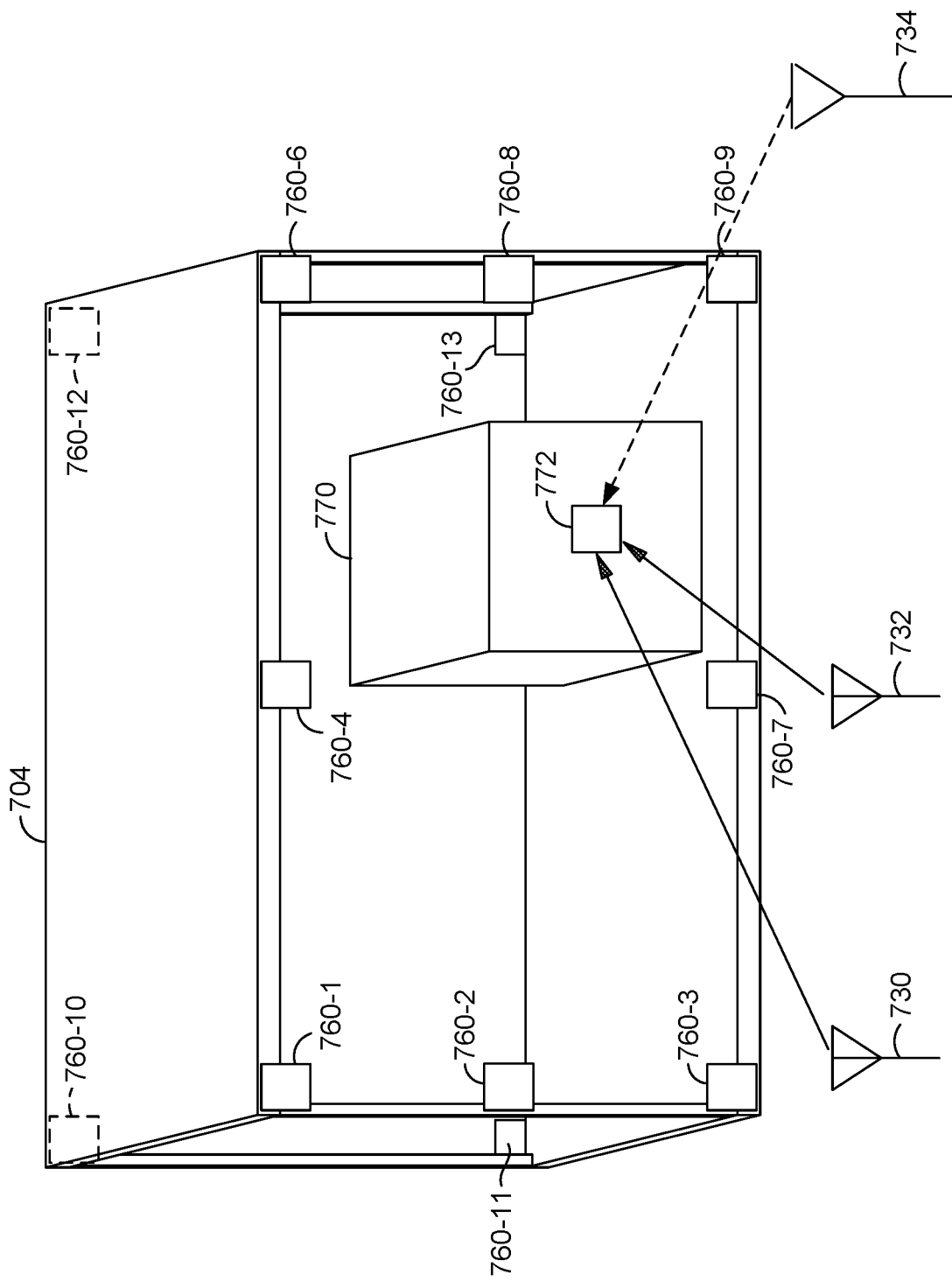

FIG. 7A is a schematic diagram of a storage unit that illustrates which particular storage unit a target asset is predicted to be located in and/or where a target asset's exact location within the storage unit is, according to some embodiments.

Figure 7B:
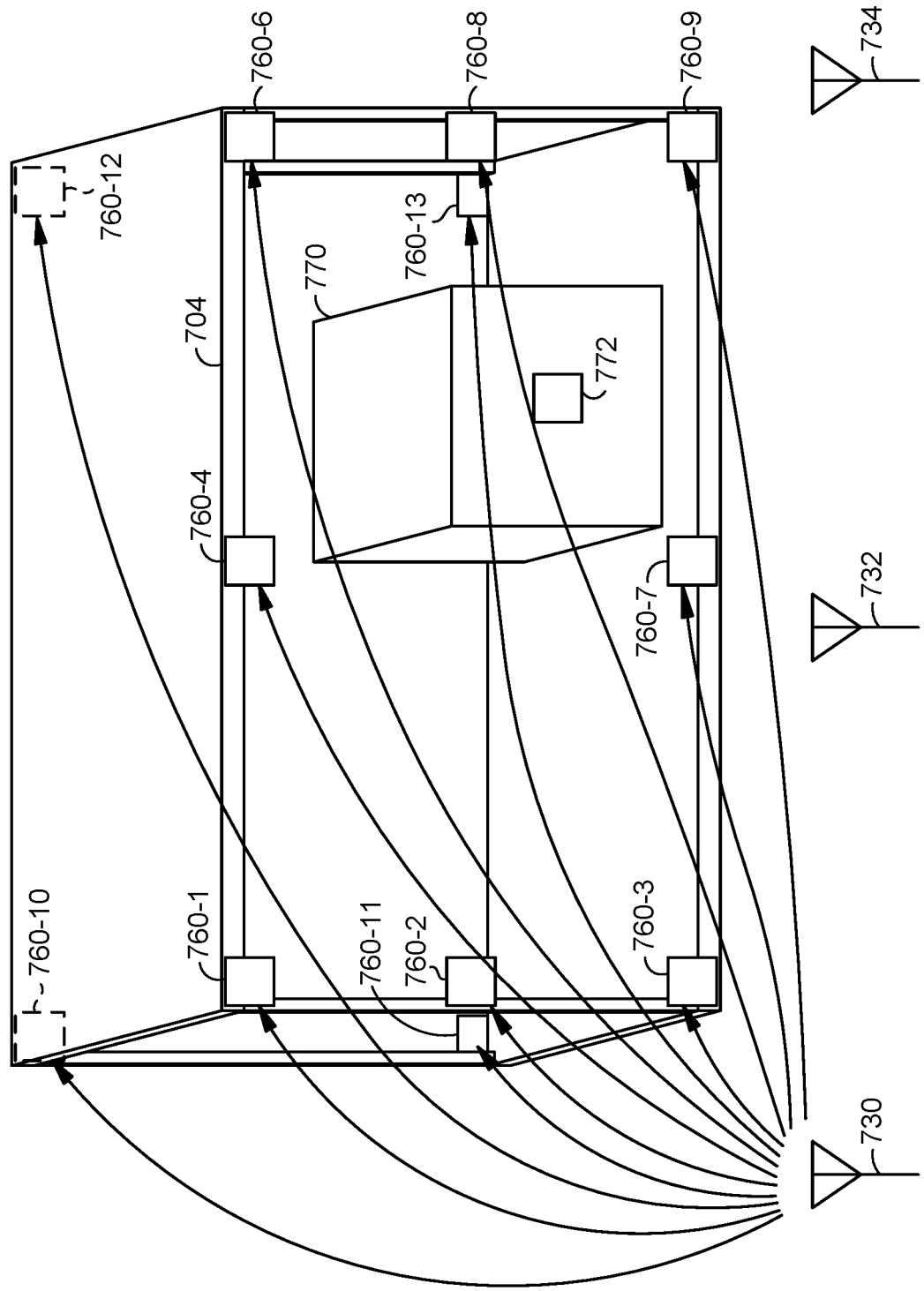

FIG. 7B is a schematic diagram of the storage unit of FIG. 7A, which that illustrates how to predict a target asset's exact location within a storage unit, according to some embodiments.

Figure 7C:
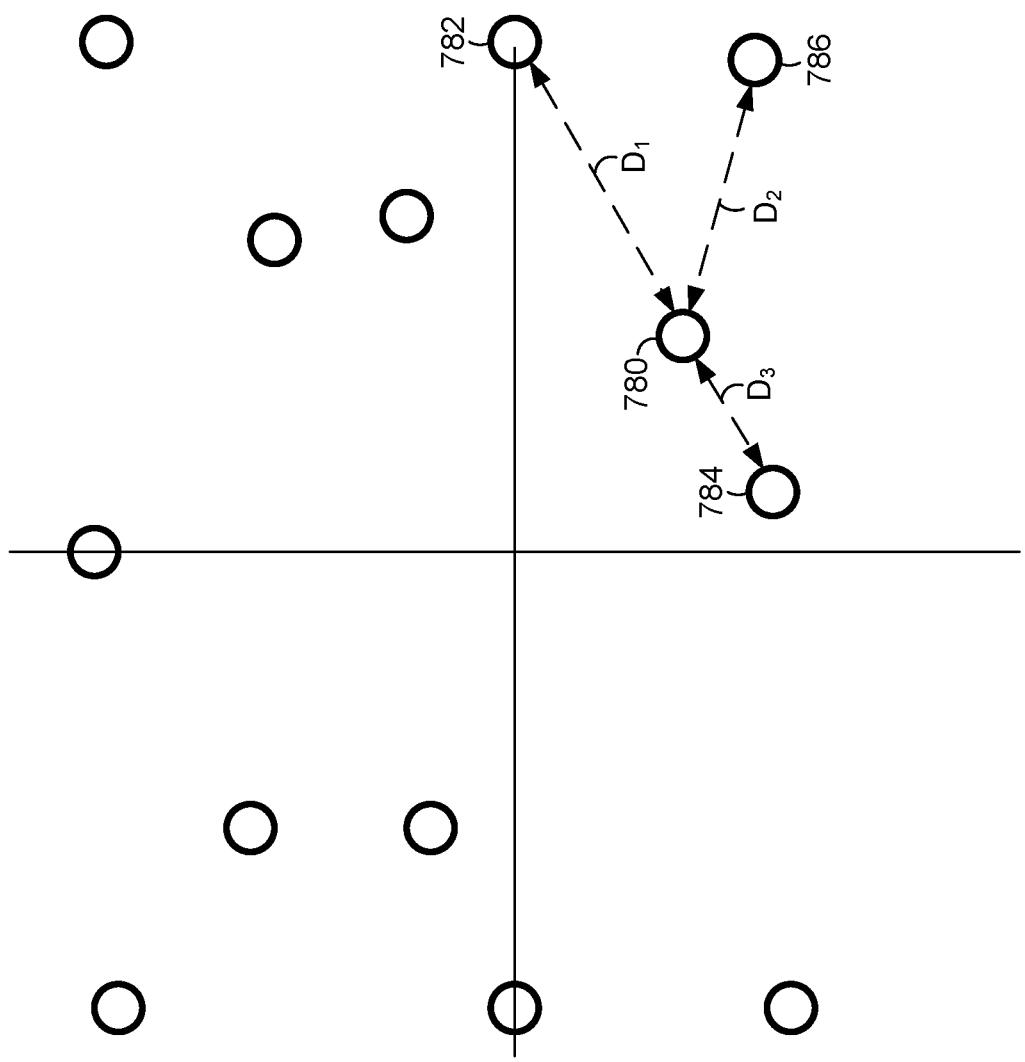

FIG. 7C represents a vector space of tags that can be superimposed or compared to FIGS. 7A and/or 7B, according to some embodiments.

Figure 8:
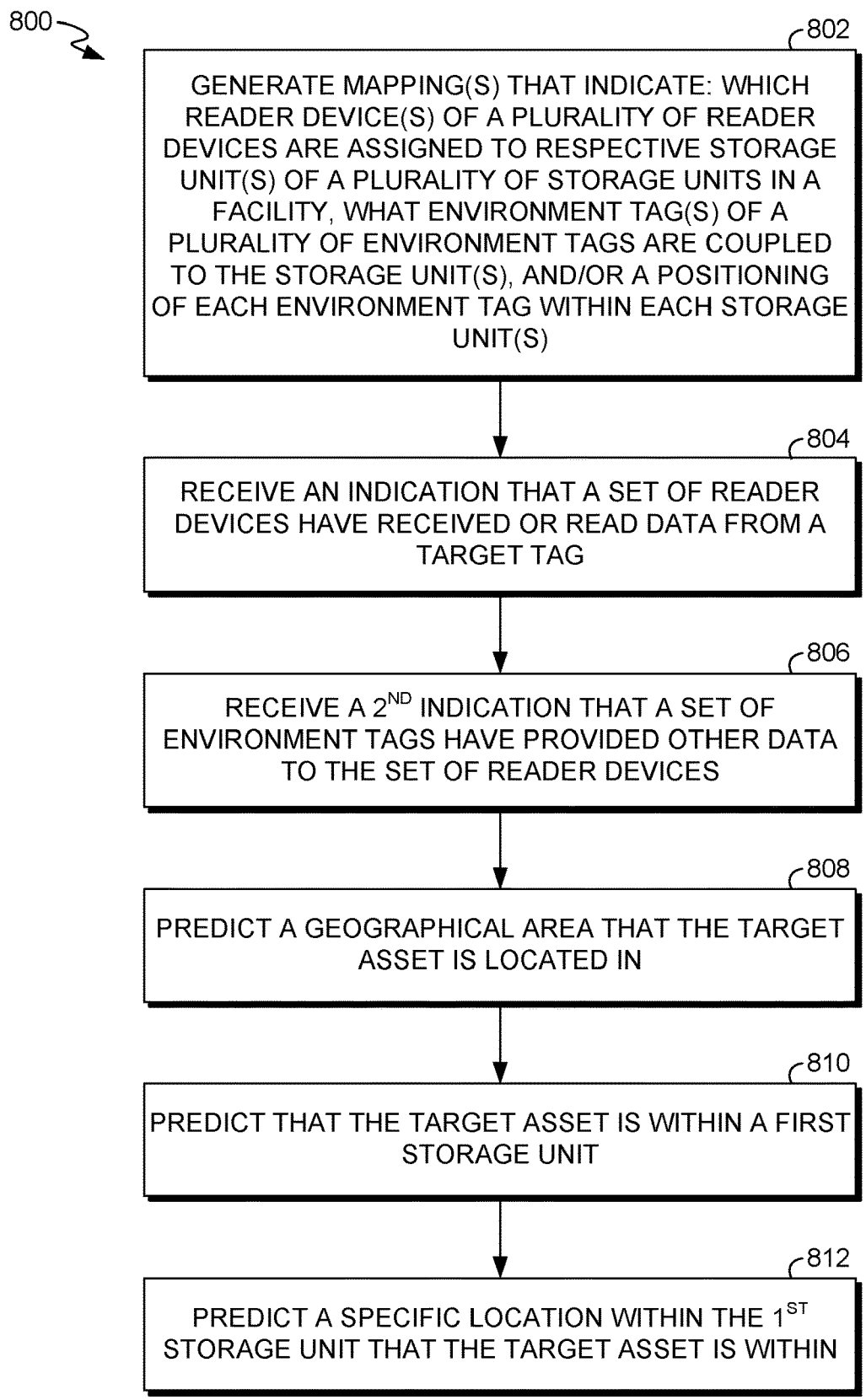

FIG. 8 is a flow diagram of an example process for predicting the specific location of an asset, according to some embodiments.

DETAILED DESCRIPTION OF THE INVENTION

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

I. Overview

In the shipping industry, before an asset (e.g., a package, parcel, container, bag of small items, etc.) reaches a final delivery destination, it typically goes through various operations. For instance, after a package has been dropped off at a carrier store for a delivery request, it may be routed to a sorting facility where the package traverses various different conveyor belt assemblies and processes in the sorting facility based on information associated with the package (e.g., size of package, destination address, weight, etc.). After traversal of the package through the sorting center, the package may be loaded into a logistics vehicle for delivery to the final delivery destination or delivery to the next sorting phase operation. Sometimes assets become lost or need to be located at the carrier store, the sorting facility, and/or in the delivery vehicle itself. For example, a package may have been misplaced by a clerk at a logistics store, a package may have fallen off a conveyor belt assembly in a sorting facility, and a package may have been accidentally placed in an incorrect storage unit in a logistics vehicle, or otherwise may need to be found. Assets may need to be located in other contexts or industries as well, such as finding items in warehouses for a particular retailer in the retailing industry, finding items in a storage room for an individual or entity, or finding any suitable asset in any suitable geographical location or corresponding structure (e.g., a building or dwelling) for any purpose. Location sensing technology may be used to help find these lost assets.

As described above, existing location sensing technologies are limited in functionality or component makeup. For example, certain infrared indoor location technologies, such as Active Badge, uses diffuse infrared technology to realize indoor location positioning. However, the line-of-sight requirement and short-range signal transmission are two limitations that suggest it to be less than effective in practice for indoor location sensing. Other examples include RADAR IEEE. 802.11 and Cricket Location Support System ultrasonic technologies. The Cricket Location Support System and similar systems (e.g., Active Bat location system) use an ultrasound time-of-flight measurement technique to provide location information. This technique, however, requires a great deal of infrastructure in order to be effective and accurate, yet the cost is so exorbitant that it is inaccessible to most users. Other technologies, such as LANDMARC (Location Identification based on Dynamic Active RFID calibration) employ reference tags that serve as reference points in the system. However, placing multiple reference tags in space can cause unnecessary noise (leading to inaccurate results) unless the signals from the location sensing are properly cleaned. Further these solutions do not account for variation in the behavior of tags. The signal strength or power level detected from the same reader from two different tags in identical locations may be different. However, LANDMARC assumes that all tags have roughly the same signal strength in emitting the RF signal, which can lead to inaccurate results.

Various embodiments of the present disclosure improve these location sensing technologies because they include new functionality and components that improve the accuracy of location sensing systems, among other things. For example, some embodiments improve Active Badge, RADAR, and Cricket Location Support System technologies because more accurate location sensing is achieved. This is at least partially because some embodiments employ multiple readers and tags in fixed locations in different geographical areas and/or along different storage units (e.g., shelves or carts). This allows for more granular or precise location sensing. For example, particular embodiments employ multiple environment tags in various geographical locations (e.g., rooms) and within multiple storage units. Using this new infrastructure setup, some embodiments can perform new functionality by predicting whether a target asset (e.g., a lost asset) is in a particular geographical location, predict whether the asset is within a particular storage unit based on the proportion of readers mapped to that shelf which are actually reading the tag on the asset, and/or can predict where an asset's exact location on the located storage unit is based on comparing indications of signal strength values between each reader and tag in the storage unit with other indications of signal strength values between each reader and the tag that is attached to the asset. In this way, very granular location sensing can be achieved, unlike Active Badge, RADAR, and Cricket Location Support Systems.

Employing multiple readers and tags in fixed locations in different geographical areas and/or along different storage units also allows for redundancy checks, which also improves existing technologies. The benefit of redundancy in these embodiments is that there may be multiple tags and/or readers in near positions such that any interference or noise experienced at one tag and/or reader location does not typically affect sensor readings of all of the other tags/readers. Ideally, wireless communication between devices occurs via a line-of-sight path (i.e., waves travel in a direct path) between transmitter and receiver that represents clear spatial channel characteristics. However, in practice communications may not occur via a line-of-site path because of physical barriers or other interference obstacles (e.g., a person walking between storage units) between transmitter and receiver. This can cause reflection, attenuation (or fading), phase shift, and/or distortion (e.g., due to noise) of the signals among other things, thereby reducing performance, such as signal strength. However, employing multiple tags/readers at different locations increases the likelihood that not all reader/tag pairs will be subject to the same interference or noise at the same time, thereby allowing more accurate sensors readings for location sensing.

Some embodiments of the present disclosure also improve LANDMARC and similar technologies. For example, particular embodiments improve these technologies via the more granular location sensing described above, where the geographical location, storage unit, and/or precise location within the storage unit can be predicted. Further, some embodiments improve LANDMARC technologies by cleaning the sensor data differently and/or not assuming that all tags have the same signal strength in emitting an RF signal. For example, some embodiments aggregate (e.g., via a mean calculation) multiple sensors readings between a particular reader and multiple tags (and/or between a particular tag and multiple readers) in case the signal strength or power level detected from the same reader/tag from two or more different tags/readers is substantially different (e.g., due to human standing interference).

Various embodiments of the present disclosure not only improve location sensing technologies but they improve conventional asset location solutions used in the shipping industry. For example, typical solutions for finding assets in the shipping industry require extensive manual human intervention, such as arduously and manually searching different locations until the asset is found. Various embodiments of the present disclosure require little to no human intervention, as location sensing technologies may be utilized as described above. Although some conventional solutions use tracking technologies, such as Global Positioning Systems (GPS) to track packages, they have an inherent problem of accurately determining locations of objects inside buildings. Further, existing GPS technologies and other solutions in the shipping industry do not perform the more granular and redundant location sensing functionality, as described above.

In is understood that although this overview section describes various improvements to conventional solutions and technologies, these are by way of example only. As such, other improvements are described below or will become evident through description of various embodiments. This overview is provided to introduce a selection of concepts in a simplified form that are further described below in the detailed description. This overview is not intended to: identify key features or essential features of the claimed subject matter, key improvements, nor is it intended to be used in isolation as an aid in determining the scope of the claimed subject matter.

II. Apparatuses, Methods, and Systems

Embodiments of the present disclosure may be implemented in various ways, including as apparatuses that comprise articles of manufacture. An apparatus may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1 is a schematic diagram of an example computing environment 100 in which aspects of the present disclosure are employed in, according to some embodiments. As shown in FIG. 1, this particular computing environment 100 includes one or more logistics servers 105 (e.g., a shipping company mainframe, cloud computing nodes, and/or logistics store desktop), a plurality of reader devices 125 (e.g., RFID readers), a plurality of environment tags (e.g., multiple RFID tags placed in a room), one or more target tags (located on one or more target assets 170 that need to be found), and one or more computing entities 110 (e.g., a mobile device, such as a DIAD or mobile phone), which are communicatively coupled via one or more networks 135. In some embodiments, "communicatively coupled" means that two or more components can perform data transportation between each other via a wired (e.g., Ethernet or fiber-optic medium connected in a LAN) or wireless (e.g., IEEE 802.15.4) computer protocol network. Each of these components, entities, devices, systems, and similar words used herein interchangeably may be in direct or indirect communication with one another over, for example, the same or different wired and/or wireless networks. Additionally, while FIG. 1 illustrates the various system entities as separate, standalone entities, the various embodiments are not limited to this particular architecture. In some embodiments, there are more or fewer (or combined) components than illustrated in the environment 100.

In various embodiments, the network(s) 135 represents or includes an IoT (internet of things) or IoE (internet of everything) network, which is a network of interconnected items (e.g., asset 170, environment tags 123, and logistic server(s) 105) that are each provided with unique identifiers (e.g., UIDs) and computing logic so as to communicate or transfer data with each other or other components. Such communication can happen without requiring human-to-human or human-to-computer interaction. For example, an IoT network may include the mobile computing entity 110 that includes an application, which sends a request, via the network(s) 135, to the logistics serer(s) 105 to determine or predict where the asset 170 is located. Responsively, the reader devices 125, the environment tags 123, and the asset tag(s) 172 may help generate sensor data so that the logistics server(s) 105 can analyze the data, as described in more detail below. In the context of an IoT network, a computing device can be or include one or more local processing devices (e.g., edge nodes) that are one or more computing devices configured to store and process, over the network(s) 135, either a subset or all of the received or respective sets of data to the one or more remote computing devices (e.g., the computing entities 110 and/or the logistics server(s) 105) for analysis. An "asset" as described herein is any tangible item that is capable of being transported from one location to another. Assets may be or include the contents that enclose a product or other items people wish to ship. For example, an asset may be or include a parcel or group of parcels, a package or group of packages, a box, a crate, a drum, a container, a box strapped to a pallet, a bag of small items, and/or the like.

In some embodiments, the local processing device(s) described above is a mesh or other network of microdata centers or edge nodes that process and store local data received from the mobile computing entity 110, the logistics server(s) 105, the reader devices 125, the target tag(s) 172, and/or the environment tags 123 and push or transmit some or all of the data to a cloud device or a corporate data center that is or is included in the one or more logistics server(s) 105. In some embodiments, the local processing device(s) store all of the data and only transmit selected (e.g., data that meets a threshold) or important data to the one or more logistics servers 105. Accordingly, the non-important data or the data that is in a group that does not meet a threshold is not transmitted. In various embodiments where the threshold or condition is not met, daily or other time period reports are periodically generated and transmitted from the local processing device(s) to the remote device(s) indicating all the data readings gathered and processed at the local processing device(s). In some embodiments, the one or more local processing devices act as a buffer or gateway between the network(s) and a broader network, such as the one or more networks 135. Accordingly, in these embodiments, the one or more local processing devices can be associated with one or more gateway devices that translate proprietary communication protocols into other protocols, such as internet protocols.

In some embodiments, the computing environment 100 represents a network of components that work together to predict the location of the asset(s) 170. For example, the target asset(s) 170 may have become lost or otherwise needs to be located. Accordingly, the computing entity 110 may receive a user request to locate one or more of the target asset(s) 170. The request may include any computer-readable indicia or ID that identifies the asset(s) 170 that needs to be found. The request may be forwarded to the logistics server(s) 105 and/or any of the other components within the environment 100 to predict the location of the target asset(s) 170 (using the location of the target tag(s) 172). The reader devices 125 are generally responsible for interrogating or reading data emitted from or located on the environment tags 123 and the target tag(s) 172. Each of the reader devices 125 may be any suitable reader machine, manufacture, or module. For example, the reader devices 125 can be Radio Frequency Identification (RFID) readers, Near-field Communication (NFC) readers, optical scanners, optical readers, bar code scanners, magnetic ink character recognition readers, beacon readers, or the like. The reader devices 125 can be coupled to or placed in any suitable location, such as a particular distance, orientation, and/or height from storage unit, on the ceiling of a building, on the floor of the building, one the walls of the building, and/or on any structure within a geographical area.

Each of the environment tags 123 is generally responsible for indicating or emitting/transmitting data (e.g., to respective reader devices 125), such as an identifier that identifies the respective environment tag, which can be used to predict the location of the target tag(s) 172 (or more generally the asset 170), as described in more detail below. For example, indications that a subset of specific reader devices 125 are reading data from the target tag 172 can indicate that the target tag 172 is located in a particular geographical area (e.g., a particular room or section of a building) based on a predefined mapping data structure that associates each reader with a room. The environment tags 123 are placed in any suitable physical environment, geographical area, and/or apparatus (e.g., one or more storage units) within such physical environment or geographical area. A "geographical area" as described herein is any suitable location, such as one or more rooms or sections of a building, the inside of a building, the area within a logistics vehicle, the inside of a logistics store, an outdoor construction yard, the inside of a warehouse, a neighborhood, and/or any suitable area within a geofence or perimeter. The environment tags 123 can be coupled to or placed in any suitable location, such as attached to a front portion of a storage unit, on the ceiling of a building, on the floor of the building, on the walls of a building, and/or any structure, position, or orientation within a geographical area.

The target tag(s) 172 are typically attached or otherwise coupled to target asset(s) 170, which need to be located because they are lost or otherwise not discoverable. Each of the target tag(s) 172 is generally responsible for indicating or emitting/transmitting data (e.g., to respective reader devices 125), such as an identifier that identifies the respective target tag, which can be used to predict the location of the target tag 172 (or more generally the asset 170), as described in more detail below. Each of the environment tags 123, and/or the target tag(s) 172 may be or include any suitable tag, machine, manufacture, module, and/or computer-readable indicia. "Computer-readable indicia" as described herein is any tag (e.g., RFID or NFC tag) information, bar code, data matrix, numbers, lines, shapes, and/or other suitable identifier that is machine-readable (and tend not to be readable by a human) because machines can process the data. For example, the target tag(s) 172 and/or the environment tags 123 can be Radio Frequency Identification (RFID) tags (active or passive), Near-field Communication (NFC) tags, optical computer-readable indicia, bar code computer-readable indicia, magnetic ink character recognition computer-readable indicia, and/or beacons or the like.

The logistics server(s) 105 is generally responsible for analyzing and generating an output (e.g., structured and/or tagged data records or user interface) for data transmitted or provided by the reader devices 125, the environment tags 123, the one or more target tags 172, and/or the computing entities 110. The configuration file mapping 130 includes one or more data structures (e.g., relational database tables, hash maps, lists, etc.) that map each of the reader devices 125 to particular geographical areas, storage units, and/or environment tags 123, as described in more detail below. A "storage unit" as described herein is any tangible area or enclosure that is configured to store or receive one or more assets. A storage unit is typically a smaller area relative to the geographical area it is within. For example, a storage unit can be or include: one or more shelf slots, one or more containers, and a locker of a locker bank, a cage, one or more cubbies, one or more drawers, one or more carts, and/or any other partial or full enclosure that receives assets within a larger geographical area. The geographical area predictor 133 is generally responsible for predicting whether the asset(s) 170 (or more specifically the tag(s) 172) is in a particular geographical area, as described in more detail below. The storage unit predictor 135 is generally responsible for predicting what storage unit the asset(s) 170 (or more specifically the tag 172) is located in within the particular geographical area predicted by the geographical area predictor 133, which is described in more detail below. The asset location predictor 137 is generally responsible for predicting the asset's 170 (or more specifically the tag 172) specific location within the storage unit predicted by the storage unit predictor 135, as described in more detail below.

1. Exemplary Analysis Computing Entities

FIG. 2 provides a schematic of a logistics server(s) 105, according to particular embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, consoles input terminals, servers or server networks, blades, gateways, switches, processing devices, processing entities, set-top boxes, relays, routers, network access points, base stations, cloud computing nodes, virtual machines, virtual containers, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In particular embodiments, these functions, operations, and/or processes can be performed on data, content, information/data, and/or similar terms used herein interchangeably.

As indicated, in particular embodiments, the logistics server(s) 105 may also include one or more communications interfaces 220 for communicating with various computing entities, such as by communicating data, content, information/data, and/or similar terms used herein interchangeably that can be transmitted, received, operated on, processed, displayed, stored, and/or the like.

As shown in FIG. 2, in particular embodiments, the logistics server(s) 105 may include or be in communication with one or more processing elements 205 (also referred to as processors, processing circuitry, and/or similar terms used herein interchangeably) that communicate with other elements within the logistics server(s) 105 via a bus, for example. As will be understood, the processing element 205 may be embodied in a number of different ways. For example, the processing element 205 may be embodied as one or more complex programmable logic devices (CPLDs), microprocessors, multi-core processors, co-processing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In particular embodiments, the logistics server(s) 105 may further include or be in communication with non-volatile media (also referred to as non-volatile storage, memory, memory storage, memory circuitry and/or similar terms used herein interchangeably). In particular embodiments, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., parcel/item/shipment database), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In particular embodiments, the logistics server(s) 105 may further include or be in communication with volatile media (also referred to as volatile storage, memory, memory storage, memory circuitry and/or similar terms used herein interchangeably). In particular embodiments, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the logistics server(s) 105 with the assistance of the processing element 205 and operating system.

As indicated, in particular embodiments, the logistics server(s) 105 may also include one or more communications interfaces 220 for communicating with various computing entities, such as by communicating information/data, content, information/data, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the logistics server(s) 105 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, long range low power (LoRa), LTE Cat M1, NarrowBand IoT (NB IoT), and/or any other wireless protocol.

Although not shown, the logistics server(s) 105 may include or be in communication with one or more input elements, such as a keyboard input, a mouse input, a touch screen/display input, motion input, movement input, audio input, pointing device input, joystick input, keypad input, and/or the like. The logistics server(s) 105 may also include or be in communication with one or more output elements (not shown), such as audio output, video output, screen/display output, motion output, movement output, and/or the like.

As will be appreciated, one or more of the logistics server(s)'s 105 components may be located remotely, such as in a distributed system (e.g., a cloud computing system). Additionally or alternatively, the logistics server(s) 105 may be represented among a plurality of computing devices. For example, the logistics server(s) 105 can be or be included in a cloud computing environment, which includes a network-based, distributed/data processing system that provides one or more cloud computing services. Further, a cloud computing environment can include many computers, hundreds or thousands of them or more, disposed within one or more data centers and configured to share resources over the network(s) 135. Furthermore, one or more of the components may be combined and additional components performing functions described herein may be included in the logistics server(s) 105. Thus, the logistics server(s) 105 can be adapted to accommodate a variety of needs and circumstances. As will be recognized, these architectures and descriptions are provided for exemplary purposes only and are not limiting to the various embodiments.

2. Exemplary Computing Entities

Computing entities 110 may be configured for electronically scanning computer-readable indicia, sending notifications, receiving notifications, and/or providing one or more portions of a user interface, map data, or other display, among other things. In certain embodiments, computing entities 110 may be embodied as handheld computing entities, such as mobile phones, tablets, personal digital assistants, and/or the like, that may be operated at least in part based on user input received from a user via an input mechanism. Moreover, computing entities 110 may be embodied as onboard vehicle computing entities, such as central vehicle electronic control units (ECUs), onboard multimedia system, and/or the like that may be operated at least in part based on user input. Such onboard vehicle computing entities may be configured for autonomous and/or or nearly autonomous operation however, as they may be embodied as onboard control systems for autonomous or semi-autonomous vehicles, such as unmanned aerial vehicles (UAVs), robots, and/or the like. As a specific example, computing entities 110 may be utilized as onboard controllers for UAVs configured for picking-up and/or delivering packages to various locations, and accordingly such computing entities 110 may be configured to monitor various inputs (e.g., from various sensors) and generated various outputs. It should be understood that various embodiments of the present disclosure may comprise a plurality of computing entities 110 embodied in one or more forms (e.g., parcel security devices kiosks, mobile devices, watches, laptops, carrier personnel devices (e.g., Delivery Information Acquisition Devices (DIAD)), etc.)

As will be recognized, a user may be an individual, a family, a company, an organization, an entity, a department within an organization, a representative of an organization and/or person, and/or the like-whether or not associated with a carrier. In particular embodiments, a user may operate a computing entity 110 that may include one or more components that are functionally similar to those of the logistics server(s) 105. FIG. 3 provides an illustrative schematic representative of a computing entity 110 that can be used in conjunction with embodiments of the present disclosure. In general, the terms device, system, computing entity, entity, and/or similar words used herein interchangeably may refer to, for example, one or more: computers, computing entities, desktops, mobile phones, micro-computers (e.g., RASBERY PI), tablets, phablets, notebooks, laptops, distributed systems, vehicle multimedia systems, autonomous vehicle onboard control systems, watches, glasses, key fobs, radio frequency identification (RFID) tags/readers, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Computing entities 110 can be operated by various parties, including carrier personnel (sorters, loaders, delivery drivers, network administrators, and/or the like). As shown in FIG. 3, the computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively. In some embodiments, the computing entity 110 includes one or more sensors 330 (e.g., a camera with object detection capabilities). The one or more sensors 330 can be one or more of: a pressure sensor, an accelerometer, a gyroscope, a geolocation sensor (e.g., GPS sensor), a radar, a lidar, sonar, ultrasound, an object recognition camera, and any other suitable sensor used to help predict the location of an asset.

The signals provided to and received from the transmitter 304 and the receiver 306, respectively, may include signaling information in accordance with air interface standards of applicable wireless systems. In this regard, the computing entity 110 may be capable of operating with one or more air interface standards, communication protocols, modulation types, and access types. More particularly, the computing entity 110 may operate in accordance with any of a number of wireless communication standards and protocols, such as those described above with regard to the logistics server(s) 105. In a particular embodiment, the computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing entity 110 may operate in accordance with multiple wired communication standards and protocols, such as those described above with regard to the logistics server(s) 105 via a network interface 320.

Via these communication standards and protocols, the computing entity 110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 110 can also download changes, add-ons, and updates, for instance, to its firmware, software (e.g., including executable instructions, applications, program modules), and operating system.

According to particular embodiments, the computing entity 110 may include location determining aspects, devices, modules, functionalities, and/or similar words used herein interchangeably. For example, the computing entity 110 may include outdoor/indoor positioning aspects, such as a location module adapted to acquire, for example, latitude, longitude, altitude, geocode, course, direction, heading, speed, universal time (UTC), date, tag/device readier IDs, and/or various other information/data. In particular embodiments, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the computing entity's 110 position in connection with a variety of other systems, including cellular towers, Wi-Fi access points, and/or the like. Similarly, the computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the computing entity 110 to interact with and/or cause display of information from the logistics server(s) 105, as described herein. The user input interface can comprise any of a number of devices or interfaces allowing the computing entity 110 to receive information/data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

As shown in FIG. 3, the computing entity 110 may also include an camera, imaging device, and/or similar words used herein interchangeably 326 (e.g., still-image camera, video camera, IoT enabled camera, IoT module with a low resolution camera, a wireless enabled MCU, and/or the like) configured to capture images. The computing entity 110 may be configured to capture images via the onboard camera 326, and to store those imaging devices/cameras locally, such as in the volatile memory 322 and/or non-volatile memory 324. As discussed herein, the computing entity 110 may be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 326. The contextual data may be stored as a portion of the image (such that a visual representation of the image data includes the contextual data) and/or may be stored as metadata (e.g., data that describes other data, such as describing a payload) associated with the image data that may be accessible to various computing entities 110.

The computing entity 110 may include other input mechanisms, such as scanners (e.g., barcode scanners), microphones, accelerometers, RFID readers (or Near-Field Communication (NFC)readers), and/or the like configured to capture and store various information types for the computing entity 110. For example, a scanner may be used to capture parcel/item/shipment information/data from an item indicator disposed on a surface of a shipment or other item. In certain embodiments, the computing entity 110 may be configured to associate any captured input information/data, for example, via the onboard processing element 308. For example, scan data captured via a scanner may be associated with image data captured via the camera 326 such that the scan data is provided as contextual data associated with the image data.

The computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the computing entity 110. As indicated, this may include a user application that is resident on the entity or accessible through a browser or other user interface for communicating with the logistics server(s) 105 and/or various other computing entities.

In another embodiment, the computing entity 110 may include one or more components or functionality that are the same or similar to those of the logistics server(s) 105, as described in greater detail above. As will be recognized, these architectures and descriptions are provided for exemplary purposes only and are not limiting to the various embodiments.

FIG. 4 is a schematic diagram depicting a top view of a building 400, which illustrates location sensing technology infrastructure, according to some embodiments. Although FIG. 4 depicts the building 400 with two rooms 450 and 452, it is understood that this is representative only. As such, the location sensing technology infrastructure (e.g., the environment tags 460, the target tag 472, and the reader devices 430, 432, 434, 436, 438, 440, 442, 444, 446) may be located in any suitable geographical area and/or more or fewer reader devices, tags, assets, rooms, or sections may exist differently than presently illustrated.

The building 400 includes the storage units 404, 406, 408, 416, 418, 420, 422, and 424. The building 400 further includes the environment tags 460-1, 460-2, 460-3, 460-4, and 460-5 (collectively referred to herein as the environment tags 460) that are coupled to the storage unit 404, as well as multiple other environment tags (e.g., 480-1, 480-2, 480-3 (collectively referred to as environment tags 480)) coupled to corresponding storage units. The building 400 further includes various reader devices-430, 432, 434, 436, 438, 440, 442, 444, and 446 (collectively referred to herein as "FIG. 2 reader devices"). The building 400 is also illustrated as containing two rooms or sections 450 and 452, which are separated by a divider or wall 414. In some embodiments, the environment tags 460, 480, and all other environment tags in the building 400 represent the environment tags 123 of FIG. 1 and vice versa. Likewise, in some embodiments, the FIG. 2 reader devices represent the reader devices 125 of FIG. 1 and vice versa. Likewise, in some embodiments, the asset 470 represents the asset 170 of FIG. 1 and vice versa.

In various situations, a user, such as carrier personnel may be trying to locate the asset 470 within the building 400. In order to locate the asset 470, the user may issue a request (e.g., via the computing entity 110) so that embodiments can predict the location of the asset 470. In various embodiments, the asset 470 has a predetermined ID, as indicated in a configuration file or mapping, which is described in more detail below. Some embodiments first predict what room (450 or 452) the asset 470 is located in based on what reader devices (or associated scanning antennas) associated with each room are currently reading or have received the ID of the asset 470 (also referred to herein as "scanning data"). Put another way, it is determined which reader devices within the building 400 have read or are reading the tag 472. Alternatively or additionally, it is determined which scanning antennas attached to the reader devices within the building 400 have received or are receiving information from the tag 472. The scanning data, for example, may indicate that only reader devices 430, 432, and 434 have read or are currently reading (e.g., in real-time or in near-real-time) the target tag 472. Embodiments, can then lookup a configuration file or data structure (described in more detail below) to map the scanning data or specific active reader devices to a specific room. For example, a mapping may indicate that reader devices 430, 432, and 435 are all located in room 450. Accordingly, a prediction can be made that the target asset 470 is located in room 450. Certain embodiments can further deduce that because no scanning data is arising from any of the reader devices 440, 442, 444, and 446 (and that a mapping shows that these reader devices belong to room 452) that the target asset 470 is not located in room 452.

In some situations, reader devices from multiple rooms or geographical areas may indicate scanning data. For example, an indication may be received that both the reader device 440 (located in room 452) and the reader device 434 (located in room 450) have read data from the target tag 472. In these situations, some embodiments perform a voting algorithm functionality and/or use this anomaly or outlier data to determine the specific location of an asset. For example, the "voting algorithm functionality" may include calculating which room or other geographical area is associated with the most scanning data and the room or other geographical area that has the most scanning data "wins" or otherwise is selected to become the target prediction room or geographical area that the target asset is predicted to be located in. For example, the asset 470 may be located within the storage unit 408. The scanning data may indicate that reader devices 434, 436, 438 (located in room 450), and 440 (located in room 452) have read or are currently reading data from the target tag 472. Certain embodiments can then look up a configuration data structure or file to determine that 3 of the reader devices are located in room 450, and only 1 reader device is located on the room 452. Accordingly, because 3 is larger than 1 indicating that the asset 470 is more likely to be in room 450 relative to room 452, the room that wins the vote is room 450. Therefore, it can be determined that the asset 470 is in room 450 and not in room 452.

In some embodiments, weighting or specific values are used to determine more granular location sensing alternative to or in addition to the voting functionality described above. For example, one or more policies or rules may indicate that the lower the probability of a target tag being in a particular geographical area, the higher likelihood that the particular target tag is located along a wall or other structure that divides two or more geographical areas. In these embodiments, threshold values (e.g., integers, floats, or other real numbers as defined in conditional statements) can define the probability policies of target tags being in a particular geographical area. For example, a rule may indicate that if the probability of a target tag being in a first geographical area is less than 70% (and reader devices from other geographical areas are reading the target tag) then embodiments can determine that the particular storage unit that the target tag is in, is located along a wall or other structure within the first geographical area. In an illustrative example, the asset 470 may be located in storage unit 408 (which is in room 450). The reader devices 434, 436, and 438 (all within room 450) and reader devices 416 and 418 (within room 452) may indicate scanning data. The probability that the tag 472 is located in room 450 may be 60% (e.g., as calculated by dividing the total number of reader devices mapped to room 450 that have or are reading the tag 472 (which is 3) by the total number of reader devices in all of the rooms that have or are reading the tag 472 (which is 5) Likewise, the probability that the tag 472 is located in room 452 may be 40% (e.g., as calculated by dividing the total number of reader devices mapped to room 452 that have or are reading the tag 472 (which is 2) by the total number of reader devices in all of the rooms that have or are reading the tag 472 (which is 5).

Both of these probabilities 60% and 40% may be below a defined threshold (e.g., 70%), as indicated in one or more policies or rules. In some embodiments, in response to the determining that the probabilities are below the defined threshold, certain embodiments can determine that the tag 472 is within room 450 (because it has the higher probability percentage of 60%) but is likely close to or along the wall/divider 414 near room 452 because room 452 is within a certain probability threshold relative to room 450. Put another way, the percentages of 40% and 60% are relatively close (or likewise the 2 reader devices of room 452 reading the tag 472 is almost equal to the 3 reader devices of room 450 reading the same tag 472) and so it is likely that the tag 472 is practically in between the two rooms or along a structure or wall that divides the two rooms. In some embodiments, the building 400 represents a computer-readable map, data structure, and/or vector embedding such that embodiments can explicitly define portions of the building 400, such as the wall 414. In this way, embodiments can explicitly determine or predict that target tags are located along walls, ceilings, floors, and/or other structures in a building.

In some embodiments, responsive to predicting which room or other geographical area an asset is within, particular embodiments perform more granular location sensing. For example, some embodiments predict that the target asset 470 (or corresponding target tag 472) is located in the storage unit 404 (and not in any of the other storage units), which is described in more detail below. Additionally or alternatively, in some embodiments, in response to predicting that the target asset 470 is located in the storage unit 404, it is predicted where the asset's exact location within the storage unit 404 is, which is described in more detail below. For example, as illustrated in FIG. 4, the asset 470 is located in a very specific location to the immediate right of the environment tag 460-5. Predicting very granular locations of assets even within storage units themselves is beneficial for various reasons. For example, a storage unit may be extremely large and/or there may be multiple other assets within the storage unit and so it may be arduous or time consuming to locate an asset even if operators know that an asset is located in the storage unit.

FIG. 5 is a diagram of a room mapping 500 that maps each reader device to a room, according to some embodiments. In some embodiments, the room mapping 500 is or is included in the configuration file mapping 130 of FIG. 1. In some embodiments, the room mapping 500 represents a data structure (e.g., a lookup table, hash map, or dictionary) that is generated to indicate which room each reader device is located in. Although the room mapping 500 includes IDs of "rooms," it is understood that this is illustrative only and as such, any geographical area (e.g., geofence ID) can alternatively be represented in the room mapping 500.

After the room mapping 500 is generated, some embodiments use the room mapping 500 to determine what room a particular reader is located in that has or is currently reading a target tag, as described, for example, with respect to FIG. 4. For example, embodiments can receive information indicating that reader IDs 1, 2, and 3 (e.g., corresponding to readers 430, 432, and 434 of FIG. 4) have or are currently reading a particular target tag (e.g., the target tag 472 of FIG. 4). Responsive to receiving this information, some embodiments query or lookup the room mapping 500 to map these IDs to room 1 (e.g., room 450 of FIG. 4), which is indicative of the target tag being located in room 1. For example, embodiments can read the first three entries of the room mapping 500 (corresponding to the reader IDs 1, 2, and 3)

based on using the reader ID as a key. Accordingly, in response to receiving the reader ID 1 based on the corresponding reader device having read or currently reading a target tag, embodiments can locate the corresponding ID 1 in the room mapping 500 under the "reader ID" column (which is in the first row or entry). Responsive to the value of "1" being located under the reader ID attribute of the mapping 500, embodiments map or locate the other entry value (i.e., 1) under the "room ID" attribute of the same entry to determine that the reader device corresponding to reader ID 1 is located in Room ID 1. This same process can be repeated for each reader device or reader IDs 2 and 3, which are currently reading or has read a target tag according to this example.

FIG. 6 is a diagram of a storage unit mapping 600 that maps each reader device to one or more tags and a storage unit, according to some embodiments. In some embodiments, the storage unit mapping 600 is or is included in the configuration file mapping 130 of FIG. 1. In some embodiments, the storage unit mapping 500 represents a data structure (or a combination of data structures) (e.g., a lookup table, hash map, or dictionary) that is generated to: indicate which reader devices are assigned or mapped to particular storage units, indicate which reader devices are assigned or mapped to particular environment tags, an indicate which environment tags are located in a particular storage unit. Whether a particular reader device is assigned or mapped to a particular storage unit and/or environment tag can be determined based on any suitable criteria. For example, a reader device can be mapped to a storage unit or environment tag if it physically faces the environment tag and/or storage unit that the environment tag is in. Alternatively or additionally, a reader device can be mapped to a storage unit and/or tag if it has been determined (with prior testing) that there is scanning data for the reader device. That is, there is an observed signal strength or connection above some threshold between a reader device and one or more environment tags that are located within the corresponding storage unit. Individual environment tags are mapped or assigned to a particular storage unit if they are to be placed within or otherwise attached/coupled to the storage unit. In some embodiments, the "environment tags" column is not present in the mapping 600 but may be included in separate or different mappings so that it can be determined what tags are located in individual storage units or are and/or what tags can be read by the reader device. For example, a first data structure might map the reader device to all of the tags that belong to it. A second data structure might map each storage unit to all of the environment tags that are coupled to it. A Third data structure may map each reader device to a storage unit. In some embodiments, each of the three data structures can act as relations or objects that are pointed to via key values or indexes from the other relations or objects, as is done, for example, in relational databases.

After the storage unit mapping 600 is generated, some embodiments use the storage unit mapping 600 to determine what storage unit and/or section of the storage unit the target asset is located in. 4. For example, embodiments can receive information indicating that only reader ID 1 (e.g., reader device 430) is currently reading a particular target tag (e.g., the target tag 472 of FIG. 4). Responsive to receiving this information, some embodiments query or lookup the storage unit mapping 600 to map this ID to storage unit 1 (e.g., the storage unit 404 of FIG. 4), which is indicative of the target tag being located in the storage unit 404. For example, embodiments can read the first three entries of the storage unit mapping 500 based on using the reader ID as a key. Accordingly, in response to receiving the reader ID 1 based on the corresponding reader device having read or currently reading a target tag, embodiments can locate the corresponding ID 1 in the storage unit mapping 600 under the "reader ID" column (which is in the first row or entry). Responsive to the value of "1" being located under the reader ID attribute of the mapping 600, embodiments map or locate the other entry value (i.e., 1) under the "storage unit ID" attribute of the same entry to determine that the reader device corresponding to reader ID 1 is located in Room ID 1. This same process can be repeated for each of the first three entries in the mapping 600 since it corresponds to the reader device (reader ID 1) that is currently or has read the target tag. This same process can also be repeated to determine what environment tags have been assigned or mapped to the reader device and/or the storage unit. For example, using the illustration above, the first three entries of the mapping 600 indicate that for reader ID 1, the environment tags that have been assigned to it are A, B, C, D, E, F, G, H, and I.

Some embodiments use the mapping 600 and/or similar data structures to predict which storage unit a target asset is located within based on the proportion of reader devices mapped to the storage unit that are actually scanning or have scanned (e.g., for a particular time window) the target asset. This is to say that some embodiments determine which reader devices are reading or have read during a time period a target asset and then mapping those reader devices to a storage unit (e.g., via the mapping 600). In an illustrative example, the following algorithm or first pseudocode sequence can be performed for each target asset needing to be located. During a time window X or in near-real-time, certain embodiments extract all scanning data for each target asset and place them into SCANS. Then, particular embodiments calculate the unique list of reader device values (e.g., reader device IDs) present in SCANS. Responsively, some embodiments use the configuration file (e.g., configuration file mapping 130 and/or the mapping 600) to identify all unique reader devices that are currently reading or have read the target asset(s). Mappings, such as mapping 600, may then be used to determine which storage IDs are mapped to the unique reader devices. Continuing with the first pseudocode sequence, for each storage unit, embodiments calculate SIGNAL_PROPORTION as the percentage or proportion of reader devices mapped to that storage unit which are present in SCANS. For example, if reader devices A, B, and C are mapped to shelf 1 (e.g., as indicated in the mapping 600), and package X has scanning data for Antenna A, C, and Q, then package X has a SIGNAL_PROPORTION of 0.66. Put another way, 2 of the 3 reader devices that are mapped to shelf 1 are actually present in the scanning data (have read or are currently reading the target tag) and so 2 divided by 3 is 0.66, representing the proportion or percentage of reader devices mapped to a given shelf that are actually scanning or have scanned a particular target tag. Accordingly, embodiments determine whether all reader devices defined in the configuration file or mapping that are mapped to a given storage unit are actually reading or have read a target tag. If all the reader devices mapped to a particular storage unit are indeed reading or have read the target tag, this represents the highest proportion or score. Conversely, if none of the reader devices that are mapped to a particular storage unit are reading the target tag, this represents the lowest proportion or score. In some embodiments, responsive to calculating the SIGNAL_PROPORTION, the storage unit with the highest SIGNAL_PROPORTION is identified and returned or determined to be the predicted storage unit that the target asset is located in.

FIG. 7A is a schematic diagram of a storage unit that illustrates which particular storage unit a target asset is predicted to be located in and/or where a target asset's exact location within the storage unit is. In some embodiments, storage unit 704 represents any suitable storage unit (e.g., 404) of FIG. 4 and the reader devices 730, 732, and 734 represent suitable reader devices (e.g., 430, 432, and 434 respectively) of FIG. 4. Some embodiments use the mapping 600 and/or similar data structures to predict that the target asset 770 is located within storage unit 704 (and not in other storage units) based on the proportion of reader devices mapped to the storage unit that are actually scanning or have scanned (e.g., for a particular time window) the target asset 770. This is to say that some embodiments determine which reader devices are reading or have read during a time period the target asset 704 and then mapping those reader devices to the storage unit 704 (e.g., via the mapping 600). In an illustrative example, the following algorithm that reflects the first pseudocode sequence can be performed for the target asset 770 needing to be located. During a time window X or in near-real-time, certain embodiments extract all scanning data for the target asset 770 and place them into SCANS (i.e., reader devices 730 and 732 are the only reader devices that have read or are currently reading target tag 772 but no other reader devices, such as reader devices 436 or 438 of FIG. 4 are reading or have read the target tag 772). Then, particular embodiments calculate the unique list of reader device values (e.g., reader device IDs 730 and 732) present in SCANS. Mappings, such as mapping 600, may then be used to determine which storage IDs are assigned to the unique reader devices (i.e., all reader devices 730, 732, and 734 are mapped to storage unit 704). For storage unit 704, embodiments calculate SIGNAL_PROPORTION as the percentage of reader devices mapped to the storage unit 704, which are present in SCANS. For example, reader devices 730, 732, and 734 are mapped to storage unit 704 (e.g., as indicated in the mapping 600), and target asset 770 has scanning data for only reader devices 730 and 732, then target asset 770 has a SIGNAL_PROPORTION of 0.66. Put another way, 2 of the 3 reader devices (730 and 732) that are mapped to storage unit 704 are actually present in the scanning data (have read or are currently reading the target tag) whereas one of the reader devices (i.e., 734) mapped to the storage unit 704 is not present in the scanning data and so 2 divided by 3 is 0.66, representing the proportion or percentage of reader devices mapped to a given shelf that are actually scanning or have scanned the target tag 772. Accordingly, embodiments determine whether all reader devices defined in the configuration file or mapping that are mapped to the storage unit 704 are actually reading or have read the target tag 772. If all of the reader devices 730, 732, and 734 that are mapped to storage unit 740 would have read the target tag 772, this represents the highest proportion or score. Conversely, if none of the reader devices 730, 732, or 734 that are mapped to the storage unit 704 would have read the target tag 772, this represents the lowest proportion or score.

In some embodiments, FIG. 7A also represents a prediction of the target asset 770's precise location within the storage unit 704 (not just an indication that the target asset 770 is within the storage unit 704, as described above). In some embodiments, predicting the precise location of the target asset 770 within the storage unit 704 is based on comparing the signal strength (or indication of signal strength, such as power) between each reader device that is mapped to the storage unit 704 and the target tag 772 with the signal strength or indication between each reader device mapped to the storage unit 704 and each environment tag attached to the storage device 704 (i.e., environment tags 760-1, 760-2, 760-3, 760-4, 760-6, 760-7, 760-8, 760-9, 760-10, 760-11, 760-12 and 760-13 (collectively referred to herein as the "reader devices 760"). In some embodiments, this occurs via the second pseudocode sequence. Extract all scanning data for the target asset 770 into SCANS (i.e., determine that reader devices 730 and 732 have or are currently reading the target tag 772), which is illustrated in FIG. 7A.

Continuing with the second pseudocode sequence, responsively, certain embodiments extract all scanning data for all environment tags coupled to the storage unit 704 that the asset 770 is within (e.g., because it was already determined that the target asset 770 is within the storage unit 704), as illustrated in FIG. 7B, for example. In some embodiments, the scanning data (or any scanning data described herein) or SCANS includes signal strength readings (or indications of signal strength readings) (e.g., −75 dB, −80 dB, or any RSSI or other signal strength standard value) between a particular reader device and environment tag/target tag. FIG. 7B is a schematic diagram of the storage unit 704 of FIG. 7A, which that illustrates how to predict a target asset's exact location within a storage unit, according to some embodiments. Specifically, FIG. 7B illustrates that scanning data (e.g., signal strength values) is extracted between each of the environments tags 760 and the reader device 730. In various embodiments, the same process is repeated for both of the reader devices 732 and 734 (i.e., scanning data is extracted between each of the environment tags 760 and each reader device 732 and 734). Continuing with description of the second pseudocode example algorithm, the unique reader device IDs present in SCANS are found and stored as ANTENNAS. Likewise, the unique environment tag IDS present in TAG_SCANS are found and stored as TAGS.

Continuing with the second pseudocode example, for each antenna in ANTENNAS: find the mean of signal strengths from the scanning data in SCANS. Subtract this average from the max possible signal strength, then divide by the max to generate a normalized distance. This is the saved in the PACKAGE_DISTANCES. In an illustrative example of this using FIG. 7A, if a user selected a time window of 5 minutes, and the signal strength value between the antenna of reader device 730 and the asset tag 772 within the 5 minute window was −75 dB, −80 dB, and −77 dB, embodiments calculate the average ((75+80+77)/3=−77.3 dB). In various embodiments, the "max possible signal strength" is the highest scan or signal strength within the time window, which in this example is −80 dB. Accordingly, 77.3 is subtracted from 80 to arrive at 2.7. Dividing by the max may include dividing 2.7 by 80, to arrive at 0.034 to generate a normalized distance, which is saved into PACKAGE_DISTANCES. This process is repeated for each reader device mapped to the storage unit where the target tag has been predicted to be within. For example, using the illustration above, signal strength values between antennas of the reader devices 732 and 734 and the same tag 772 can also be normalized as described above. In this way, based on the signal strengths values, it is determined whether the asset tag 772 is relatively close or farther away from a particular antenna of a reader device (e.g., 730) relative to the distance between other antennas of other reader devices (e.g., 732 and 734). In these embodiments, signal strength or indications of signal strength is converted to distance metrics to determine how Continuing with the second pseudo code example, for each tag in TAGS: and for each antenna (of each reader device) in ANTENNAS: determine the mean of signal strengths from the scans in TAG_SCANS. Subtract this average from the max possible signal strength, then divide by the max to generate a normalized distance. Save this into TAG_DISTANCES. In an illustrative example of this using FIG. 7B, if a user selected a time window of 5 minutes, and the signal strength value between the antenna of reader device 730 and environment tag 760-3 within the 5 minute window was −60 dB, −65 dB, and −61 dB, embodiments calculate the average ((60+65+61)/3=−62 dB). In various embodiments, the "max possible signal strength" is the highest scan or signal strength within the time window, which in this example is −65 dB. Accordingly, 62 is subtracted from 65 to arrive at 3. Dividing by the max may include dividing 3 by 65 to arrive at 0.046 to generate a normalized distance, which is saved into TAG_DISTANCES. This process is repeated between each reader device mapped to the storage unit where the target tag has been predicted to be within and each environment tag of the storage unit. For example, using the illustration above, signal strength values between antennas of the reader devices 732 and 734 and each of the environment tags 760 can also be normalized as described above. In this way, the precise location of the asset tag 772 is predicted within the storage unit 704 based on comparing a distance between all normalized distances, which can act as data points in an embedding.

Continuing with the second pseudocode algorithm, the Euclidian distance between the asset tag 772 and all of the environment tags 760 within the storage unit 704 is calculated using PACKAGE_DISTANCES and TAG_DISTANCES as data points in space. The space for distance calculation is defined by the mean reader device signal strengths and will have a number of dimensions equivalent to the number of reader devices in ANTENNAS. Store the Euclidian distances into PACKAGE_TAG_DISTANCES. In this way each PACKAGE_DISTANCES values for each reader device represent a dimension and are averaged or otherwise aggregated to form a data point or a value in PACKAGE_TAG_DISTANCES. In an illustrative example of calculating Euclidian distance using TAG_DISTANCES, referring back to FIG. 7B, the signal strength between reader device 730 and target tag 772 may be −72 dB (a first dimension), and the signal strength between reader device 732 and target tag 772 may be −60 dB (a second dimension), and the signal strength between reader device 734 and target tag 772 may be −30 dB (a third dimension) each of these values can be averaged or otherwise aggregated in vector space to represent a single data point, as illustrated for example, by the data point 780 FIG. 7C.

FIG. 7C represents data points in dimensional or vector space. In some embodiments, "data points" thus represent a finalized value that aggregates sub-values, where the sub-values represent dimensions. In an illustrative example of calculating Euclidian distance using PACKAGE_DISTANCES, referring back to FIG. 7A, the signal strength between reader device 730 and target tag 772 may be −72 dB (a first dimension), and the signal strength between reader device 732 and target tag 772 may be −60 dB (a second dimension), and the signal strength between reader device 734 and target tag 772 may b −30 dB (a third dimension) each of these values can be averaged or otherwise aggregated in vector space to represent a single data point, as illustrated for example, by the data point 780 FIG. 7C. FIG. 7C represents data points in dimensional or vector space. In some embodiments, "data points" thus represent a finalized value that aggregates sub-values, where the sub-values represent dimensions.

In some embodiments, based on a user-defined K value (e.g., 3), the environment tags with the smallest K distances from PACKAGE_TAG_DISTANCES are identified. These tag identifiers and their distances to the package may be saved as "CLOSEST_TAGS. In some embodiments, a weight for each tag is generated based at least in part on normalizing the distance in CLOSEST_TAGS into the range [0,1] (0 to 1). Then CLOSEST_TAGS can be updated with this value. Some embodiments update each tag in CLOSEST_TAGS with its X and Y value from the configuration file (e.g., the configuration mapping 130). As described above, in some embodiments, environment tags are placed on each storage unit in regular, fixed positions. Particular embodiments treat each storage unit as a 2-dimensional X/Y grid and record the location for each tag on this grid in the configuration file (e.g., reader device 1 is in the top left, and so is at (0, 100). Then some embodiments calculate the most likely X-coordinate of the package as the weighted average of the X-coordinates from CLOSEST_TAGS. Some embodiments, repeat this step for the Y-coordinates.

IV. Exemplary System Operation

FIG. 8 is a flow diagram of an example process 800 for predicting the specific location of an asset, according to some embodiments. The process 800 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. For example, in some embodiments, the process 800 may not include blocks 802, 808, and/or 810. The computer-implemented method, the system (that includes at least one computing device having at least one processor and at least one computer readable storage medium), and/or the computer program product/computer storage media as described herein may perform or be caused to perform the process 800, and/or any other functionality described herein. In some embodiments, the logistics server(s) 105 performs the process 800. Alternatively, some or all of the components of FIG. 1 performs the process 800.

Per block 802, one or more mappings are generated that indicate: which reader device(s) of a plurality of reader devices are assigned to respective storage unit(s) of a plurality of storage units in a facility, what environment tag(s) of a plurality of environment tags are coupled to the storage unit(s), and/or a positioning of each environment tag within each storage unit(s). In some embodiments, the "mappings" (e.g., data structures) of block 802 includes the mappings 506 and/or 600 of FIGS. 5 and 6 respectively and/or block 802 includes some or all of the functionality as described with respect to the configuration file mapping 130 of FIG. 1.

In various embodiments, "assigned" refers to one or more data structure mappings or associations. For example, FIG.

6 illustrates that reader device ID 1 is assigned to storage unit 1, and reader device 2 is assigned to storage units 2 and 3. In some embodiments, the "positioning" described in block 802 refers to any suitable location identifier according to any suitable granularity. For example, a mapping or data structure may indicate whether environment tags are generally located in a particular quadrant (e.g., 1 of 4 quadrants—a top right, bottom right, bottom left, and top left) of a storage unit or may indicate the exact positioning of each environment tag within a storage unit. For example, embodiments can generate and use a multi-dimensional coordinate grid data structure or object. For instance, the multi-dimensional coordinate grid can be an X-Y grid position where environment tags are only placed on an outside of a storage unit on a same plane. Alternatively, the multi-dimensional coordinate grid can be an X-Y-X grid positioning where environment tags are placed at different depths, planes, on the outside and inside of storage units, etc., as indicated in FIG. 7A, for example. In some embodiments, the multi-dimensional coordinate grid shows or models a particular storage unit and the exact positioning of each environment tag within the storage unit.

As described above, the plurality of storage units, environment tags, and reader device are located in a particular facility. In some embodiments, the facility is a shipping facility, such as a shipping sorting center, a logistics store, or logistics vehicle. As described above, in various embodiments, assets can become lost in any one of these facilities. An "asset" as described herein is any tangible item that is transported from one location to another. Assets may be or include the contents that enclose product or other items people wish to ship. For example, an asset may be or include a parcel or group of parcels, a package or group of packages, a box, a crate, a drum, a container, a box strapped to a pallet, a bag of small items, and/or the like. In some embodiments, the facility is an enclosed facility or building that has a roof and has multiple floors and/or rooms. Alternatively or additionally, a facility can include non-enclosed areas, such as construction yards, open fields, or any other geographical area that is not enclosed or has no roof.

In some embodiments, the one or more reader devices, the plurality of environment tags (and/or the target tag as described below) is part of a Radio Frequency Identification (RFID) system. Accordingly, these components may include the components and functionality of RFID tags and readers, for example. RFID is a way to store and retrieve data through electromagnetic transmission to an RF compatible integrated circuit. An RFID reader device can read data emitted from or located within RFID tags. RFID readers and tags used a defined radio frequency and protocol to transmit or provide (tags) and receive (readers) data. RFID tags are categorized as at least passive or active. Passive RFID tags operate without a battery. They reflect the RF signal transmitted to them from a reader device and add information by modulating the reflected signal. Their read ranges are limited relative to active tags. Active tags contain both a radio transceiver and a batter to power the transceiver. Since there is an onboard radio on the tag, active tags have more range than passive tags. It is noted however, that the reader devices, environment tags, and/or target tag need not be a part of RFID protocols, but can alternatively or additionally include other protocols, such as BLUETOOTH LOW ENERGY (BLE), Bar codes, QR codes, and the like.

In some embodiments, the one or more mappings of block 802 map each storage unit as a multi-dimensional X-Y coordinate grid indicating a precise location of each environment tag within the respective storage unit. For example, referring back to FIG. 7A, some embodiments map the environment tags 760-1, 760-2, 760-3, 760-4, 760-6, 760-7, 760-8, and 760-9 in a data structure that indicates the exact positioning as illustrated in FIG. 7A. In some embodiments, the first value in a coordinate grid indicates the magnitude of the X-Axis or direction and the second value of the coordinate grid indicates the magnitude of the Y-Axis or direction. For example, using FIG. 7A for illustration, since reader device 760-1 is in the top left-most position, it can be represented as [0 (X-axis), 100 (Y-axis)], since reader device 760-3 is in the bottom left-most position, it can be represented as [0, 0] (i.e., the origin), since reader device 760-6 is in the top right-most position, it can be represented as [100, 100], since reader device 760-9 is located in the bottom right-most position, it can be represented as [100, 0].

In this way, both X and Y axis magnitudes can be represented such that each environment tag position is represented as a particular X-Y coordinate. It is understood, however, that the coordinate grid need not be limited to X-Y coordinates, but any suitable coordinate grid system can be used. For example, some embodiments include a Z-plane or depth perception plane coordinate. For instance, referring back to FIG. 7A, environment tags 760-10, 760-11, 760-12, and 760-13 can be represented by a Z-plane coordinate given that these environment tags are located at a different plane or depth relative to the other environment tags since these environment tags are located at the back of the storage unit, as opposed to on the front.

Per block 804, particular embodiments receive an indication that a set of reader devices have received or read data from a target tag. In some embodiments, this received or read data includes an identifier identifying the target tag, an identifier identifying what reader devices has performed the receiving or the reading, and/or signal strength value(s) (e.g., a particular RSSI reading) between the set of reader devices and the target tag. An "indication" as described herein is a message, notification, communication, or representation. (e.g., a hash value). In some embodiments, the geographic area predictor 133 or logistics server(s) 105 is the component that performs block 804. Alternatively or additionally, the reader devices 125 or any other set of reader devices perform block 804. In these embodiments, a plurality of reader devices that are configured to receive (e.g., based on an active tag that transmits data to a reader device) or read data from (e.g., based on a passive tag that is activated based on interrogation) from one or more tags (e.g., the target tag 172 or other environment tags 123). The plurality of reader devices and the one or more tags may be located in the facility (e.g., as illustrated in the facility 400 of FIG. 4). In some embodiments, in response to these reader devices receiving or reading data from the one or more tags, they transmit this information to a computing device (e.g., the logistics server(s) 105) for further processing. For example, in some embodiments, the logistics server(s) or other computing device(s) receive an indication that one or more reader devices has received or read data from a target tag that is coupled to a target asset. In this way, further predictions can be made, such as predictions described by the functionality of the geographical area predictor 133, the storage unit predictor 135, and the asset location predictor 137.

In an illustrative example of block 804, referring back to FIG. 4, the logistics server(s) 105 may receive an indication that only reader devices 430, 432, and 434 have received or read data from the target tag 472. In some embodiments, block 804 includes functionality described with respect to FIG. 7A where it is described that the reader devices 730 and 732 have read the target tag 772.

Per block 806, particular embodiments receive a second indication that a set of environment tags have provided other data to the set of reader devices. In some embodiments, the "other data" described herein is includes an identifier identifying the set of environment tags that have provided the other data, an identifier identifying what reader devices have received the provided other data, and/or signal strength value(s) (e.g., a particular RSSI reading) between the set of reader devices and the environment tags. In some embodiments, the storage unit predictor 135 or logistics server(s) 105 is the component that performs block 804. Alternatively or additionally, the reader devices 125 or any other set of reader devices perform block 804. In these embodiments, a plurality of environment tags that are configured to provide other data to at least one reader devices of the plurality of reader devices are received. For example, referring back to FIG. 4, the reader device 430 can read or receive information from the environment tag 460-1 and 460-2 identifying the ID of environment tags 460-1 and 460-2.

In some embodiments, in response to these reader devices receiving the second indication per block 806, at least one reader device can transmit this information to a computing device (e.g., the logistics server(s) 105) for further processing. For example, in some embodiments, the logistics server(s) 105 or other computing device(s) alternatively or additionally receive the second indication that a plurality of environment tags have provided other data to the one or more reader devices, wherein a first set of environment tags of the plurality of environment tags are coupled to a first storage unit within the facility, and a second set of environment tags of the plurality of environment tags are coupled to a second storage unit within the facility. In this way, further predictions can be made, such as predictions described by the functionality of the asset location predictor 137.

In another illustrative example of block 806, referring back to FIG. 4, the logistics server(s) 105 receive a second indication that the environment tags 400-1 and 400-2 of storage unit 404 and a single environment tag from the storage unit 406 has provided the other data to the reader devices 430, 432, and/or 434. In some embodiments, block 806 includes functionality described with respect to FIG. 7B where it is described that the reader device 730 receives the data from all of the environment tags 760.

In some embodiments, the receiving or reading of data by the reader devices from the target tag (as described in block 804) and/or the providing of the other data by the plurality of environment tags to at least one reader device of the plurality of reader devices (as described in block 806) occurs continuously according to a particular predefined time window. That is, these components repeatedly receive, read, or provide corresponding data based on a window policy. For example, embodiments can poll the plurality of reader devices every particular time interval (e.g., every 5 minutes) (and/or the plurality of reader devices can be configured to send its data every particular time interval) to determine which of the reader devices have received or read data from a target tag and which environment tags have provided the other data to any reader device within a facility. For instance, embodiments can poll the entire facility 400 to make this determination. In some embodiments, the time window is a sliding time window such that there is real-time (or near-real-time) receiving of these indications.

Per block 808, particular embodiments predict a geographical area that the target asset is located in. In some embodiments, block 808 is based at least in part on an identification of a set of reader devices (of the plurality of reader devices) receiving or reading the data (e.g., first data) from the target tag. In some embodiments, block 808 includes some or all of the functionality as described with respect to the geographical area predictor 133. In some embodiments, block 808 includes some or all of the functionality as described with respect to FIG. 7A.

In some embodiments, the predicting of the geographical area that the target asset is located in within the facility includes predicting what room, of a plurality of rooms that the target asset is in within the facility. For example, this is described with respect to FIG. 4 where there are rooms 450 and 452 and embodiments can predict that the target asset 470 is located within the room 450 (and not in room 452) based on scan data indicating that reader devices 430, 432, and 434 have received or read data from the target tag 172. In this way, embodiments can predict a geographical area that the target asset is located in within the facility based at least in part on an identification of one or more reader devices (e.g., 430, 432, 434 of FIG. 1) receiving the data from the target tag and other reader devices (e.g., 440 and 444 of FIG. 1) not receiving any data from the target tag.

It is understood that "geographical area" can represent any suitable structure and/or area and not only rooms. For example, the geographical area can include or represent one or more: geo-fences, buildings, sections of a room, sections of a vehicle, sections of a trailer, sections of a warehouse, a square-mile distance, and the like.

Per block 810, some embodiments predict or determine that the target asset is within a first storage unit. In some embodiments, block 810 includes some or all of the functionality as described with respect to the storage unit predictor 135. In some embodiments, block 810 includes predicting that the target asset is within the first storage unit based at least in part on at least one reader device (that is mapped to the first storage unit) that has received or read the first data from the target tag. For example, referring back to FIG. 6 and FIG. 1, the logistics server(s) 105 can receiving an indication that the reader device corresponding to reader ID 1 has received or read data from the target tag 172. Responsively, embodiments can perform a lookup or otherwise scan the mapping 600 and determine that reader ID 1 is only mapped to storage unit 1. Accordingly, embodiments can determine that the target asset 170 is located within storage unit 1. In some embodiments block 810 includes some or all of the functionality described above with respect to the first pseudocode sequence/algorithm/example or FIG. 7A.

In some embodiments, block 810 includes the following functionality. Based on one or more mappings (e.g., the mapping 600), determine which reader device(s) of a plurality of reader devices are assigned to particular storage units within the facility and determining what environment tags of the plurality of environment tags are coupled to the particular storage unit. For example, referring back to FIG. 6, embodiments can determine all reader IDs, environment tags, and storage units and their respective mappings based on the mapping 600. Based at least in part on the one or more mappings, some embodiments determine, for each storage unit, a proportion of the set of reader devices mapped to the respective storage unit that have received or read data from the target tag. This is described with respect to the first pseudocode sequence/algorithm/example or FIG. 7A. For example, if reader devices A, B, and C are mapped to storage unit 1 (e.g., as indicated in the mapping 600), and the target tag has provided data to reader devices A, C, and Q, the target tag has a SIGNAL_PROPORTION of 0.66 as described above.

In some embodiments, the functionality of block 810 further includes predicting that the target asset is within the first storage unit based at least in part on the proportion described above being the highest for the first storage unit relative to the second storage unit. For example, using the illustration above, the SIGNAL_PROPORTION of 0.66 may be the proportion of the second storage unit. However, the SIGNAL_PROPORTION of the first storage unit may be 1 or 100% because the target tag has provided data to reader devices A, B, and C, which are all the reader devices mapped to the storage unit 1. Accordingly, storage unit 1 has the "highest" proportion of reader devices mapped to the respective storage unit that have received or read data from the target tag. It is understood that there may exist more than 2 storage units in a facility. Accordingly, block 810 functionality can be performed on any quantity of storage units and reader devices, as described, for example, with respect to FIG. 4.

Per block 812, embodiments predict a specific location (e.g., quadrant, section) within the first storage unit that the target asset is within. In some embodiments, block 812 includes some or all the functionality as described with respect to the asset location predictor 137. In some embodiments, block 812 is performed based at least in part on comparing one or more indications (e.g., actual RSSI values, power levels, distances, etc.) of signal strength values between the at least one reader devices and each environment tag of the first set of environment tags with one or more other indications of signal strength values between the at least one reader device and the target tag. For example, this is described with respect to the second pseudocode sequence/example/algorithm as described above and/or some or all of the functionality with respect to FIGS. 7B (and 7A). Power levels can be "indications" of signal strength values because in some embodiments, each reader device has a pre-determined power level, thus defining a certain range in which it can detect one or more tags. By properly placing reader devices within the facility, the facility can be uniquely identified by the subset of reader devices that cover that sub-region. Given a particular tag, based on the subset of reader devices that can detect it, the tag can be associated with a known sub-region.

In an illustrative example of block 812, referring back to FIGS. 7A and 7B, embodiments can determine the signal strength values between the reader device 730 and the environment tags 760. For instance, embodiments can determine that the reader device 730 receives or reads data from the environment tag 760-3 at −50 dB and the reader device 730 receives or reads data from the environment tag 760-8 at −90 dB (a lower signal strength value). Likewise, embodiments can determine that the reader device 730 receives or reads data from the target tag 772 at −85 dB. Responsively, some embodiments compare −50 dB, −90 dB, and −85 dB. Some embodiments identify the indication of the signal strength value corresponding to the target tag (i.e., −90 dB) and determines which signal strength indication is closest in value to the target tag signal strength value. For instance, using the example above, −85 dB is closer to −90 dB than −50 dB. Responsively, some embodiments determine that environment tag 760-8 is physically closer to the target tag 772 relative to the environment tag 760-3 based on the determining that −85 dB is closer to −90 dB than −50 dB. Responsively, embodiments can, for example, determine that the target asset 770 is located on the right quadrant of the storage unit 704 relative to the left quadrant based on determining that the environment tag 760-8 is closer to the target tag 772 relative to the environment tag 760-3. In some embodiments, all of this functionality is repeated for each reader device mapped to the storage unit 704 (i.e., reader device 732 and 734) and the rest of the individual environment tags coupled to the storage unit (i.e., environment tags 760-1, 760-2, 760-4, 760-6, 760-7, 760-9, 760-10, 760-11, 760-12, 760-13). In this way, the location of the asset 770 can be predicted with more granularity. For instance, instead of just determining or predicting the quadrant the target asset is within, one or more sub-quadrants of a location can be determined.

Some embodiments alternatively or additionally predict a specific location within the first storage unit that the target asset is within for block 812 based at least in part on comparing indications of signal strength values for two or more reader devices and whichever indication indicates the strongest signal strength represents the reader device closest to the target tag. For example, referring back to FIG. 7A, some embodiments compare indications of the signal strength values between the reader device 730 and the target tag 772 with indications of signal strength values between the reader device 732 (and/or 734) and the same target tag 772. For instance, embodiments can determine that the signal strength between the reader device 730 and the target tag 772 is −80 dB, whereas the signal strength between the reader device 732 and the same target tag 772 is −75 dB. These two signal strength values are compared and based on −75 dB represents a stronger connection, embodiments can determine that the reader device 732 is closer to the target tag 772. As described above, some embodiments include one or more predefined mappings and the one or more mappings may assign each reader device a spatial area within the first storage unit that corresponds to a particular portion of the first storage unit, which may be used to predict an area that the target asset is within. For example, referring back to FIG. 7A, the one or more mappings may indicate that reader device 730 covers a left quadrant of the first storage unit, the reader device 732 covers a middle quadrant of the first storage unit, and the reader device 734 covers a right quadrant. Accordingly, referring back to the example above, because −75 dB is higher relative to −80 dB, embodiments can predict that the target asset is located somewhere in the middle of the storage unit 704.

Some embodiments represent signal strength indications between each reader device that receives data from the target tag as a first set of vectors in vector space and represent signal strength indications between each environment tag mapped to the first storage unit and the each reader device as a second set of vectors in vector space and determine a distance between the first set of vectors and the second set of vectors, wherein the distance corresponds to a physical proximity between the each reader device, the target tag, and the each environment tag. For example, this distance and functionality may correspond to the calculating of Euclidean distance between the PACAKGE_DISTANCES and TAG_DISTANCES as described above with respect to the second pseudocode algorithm or FIG. 7C. In some embodiments, this functionality includes calculating the Euclidean distance in the vector space of average signal strength values for the target tag and all environment tags mapped to the first storage unit for the same set of reader devices. Some embodiments responsively generate a vector of k weights based on the vector of Euclidian distance $E_j$, via the following calculation:

$$Wj = \frac{(1/Ej)^2}{\sum_{i=0}^{k}(1/Ej)^2}.$$

Responsively, particular embodiments can multiply the known locations of the environment tags by the weights to predict the X, Y coordinate via the following calculations:

$$(x,y)=(\Sigma_{i=1}^{k}wi*xi, \Sigma_{i=1}^{k}wi*yi).$$

In some embodiments, the distance corresponds to the Euclidian distance in signal strength (or indication of signal strength) between a target tag and a given environment tag given the same reader device(s) that read or receive data from the target tag and the given environment tag. The distance may correspond to a physical separation proximity between the given environment tag and the target tag.

Some embodiments compare the distance with a configuration file mapping (or a portion of the one or more mappings) that maps each storage unit as a multi-dimensional X-coordinate and Y-coordinate grid indicating a precise location of each environment tag within the first storage unit. For example, as described above some embodiments identify environment tags with the k smallest distance from PACKAGE_TAG_DISTANCES, which are saved as CLOSEST_TAGS. Responsively, a weight is generated for each environment tag by normalizing the distances in CLOSEST_TAGS into a range (e.g., 0 to 1). The CLOSEST_TAGS are then updated with a respective new value corresponding to the range. Further each tag in CLOSEST_TAGS are updated with its X and Y value from the configuration file. Responsively, certain embodiments calculate the most likely X-coordinate of the target asset as the weighted average of the X coordinates from CLOSEST_TAGS. This process can be repeated for the Y-coordinate. Alternatively or additionally some embodiments have pre-defined data points As described above, some embodiments compute a distance in vector space corresponding to the Euclidian distance in signal strength (or indication of signal strength) between a target tag and a given environment tag given the same reader device(s) that read or receive data from the target tag and the given environment tag. In this way, vector space can be superimposed over or compared to a mapping of each environment tag to determine coordinates of the target tag. For example, in some embodiments FIG. 7C represents a vector space of tags that can be superimposed or compared to FIGS. 7A and/or 7B (e.g., a mapping indicating the X-Y coordinates). For instance, the data point 780 may represent the target tag 712 and the data point 782 may represent the environment tag 760-8, the data point 786 may represent the environment tag 760-9, and the data point 784 may represent the environment tag 760-7. In this way, the data points may spatially represent the physical tags in physical space. Thus, the positioning of the target tag or data point 780 can be transposed to the diagram of FIG. 7B, indicating that the target tag is at a particular pre-determined coordinate (e.g., 80 in X direction and 30 in Y direction).

DEFINITIONS

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

The terms first (e.g., first request), second (e.g., second request), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, the logistics server(s) 105 may "cause" a message to be displayed to a computing entity 110 (e.g., via transmitting a message to the user device) and/or the same computing entity 110 may "cause" the same message to be displayed (e.g., via a processor that executes instructions and data in a display memory of the user device). Accordingly, one or both systems may in isolation or together "cause" the effect of displaying a message.

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

The term "coupled" to refers to two or more components being attached, fixed, or otherwise connected. Any suitable component can be used to couple components together, such as one or more: screws, bolts, nuts, hook fasteners, nails, adhesive, etc.

The following embodiments represent exemplary aspects of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting:

What is claimed is:

1. A system comprising:
a plurality of reader devices that is configured to receive or read data from one or more tags, the plurality of reader devices is located in a facility;
a plurality of environment tags that is configured to provide data to at least one reader device of the plurality of reader devices, wherein a first set of environment tags of the plurality of environment tags is coupled to a first storage unit within the facility, and a second set of environment tags of the plurality of environment tags is coupled to a second storage unit within the facility;
a target tag coupled to a target asset that is located in the facility; and
one or more computing devices that are configured to:
predict a geographical area that the target asset is located in within the facility based at least in part on an identification of a set of reader devices, of the plurality of reader devices, receiving or reading first data from the target tag,
predict that the target asset is within the first storage unit based at least in part on at least one reader device, mapped to the first storage unit, that has received or read the first data from the target tag, and
predict a specific location within the first storage unit that the target asset is within based at least in part on comparing one or more indications of signal strength values between the at least one reader device and each environment tag of the first set of environment tags with one or more other indications of signal strength values between the at least one reader device and the target tag.

2. The system of claim 1, wherein the predicting of the geographical area that the target asset is located in within the facility includes predicting what room, of a plurality of rooms, that the target asset is in within the facility.

3. The system of claim 1, wherein the predicting that the target asset is within the first storage unit includes:
based on one or more mappings, determining which reader devices of the plurality of reader devices are assigned to particular storage units within the facility and determining which environment tags of the plurality of environment tags are coupled to the particular storage units; and
based at least in part on the one or more mappings, determining, for each storage unit, a proportion of the set of reader devices mapped to the respective storage unit that has received or read data from the target tag.

4. The system of claim 3, wherein the predicting that the target asset is within the first storage unit includes predicting that the target asset is within the first storage unit based on the proportion being highest for the first storage unit relative to the second storage unit.

5. The system of claim 1, wherein the predicting of the specific location within the first storage unit that the target asset is within includes representing signal strength indications between each reader device that receives data from the target tag as a first set of vectors in vector space and representing signal strength indications between each environment tag of the first set of environment tags and the each reader device as a second set of vectors in the vector space and determining a distance between the first set of vectors and the second set of vectors, wherein the distance corresponds to a physical proximity between the each reader device, the target tag, and the each environment tag.

6. The system of claim 5, wherein the predicting of the specific location within the first storage unit includes comparing the distance with a configuration file mapping that maps the first storage unit as a multi-dimensional X-coordinate and Y-coordinate grid indicating a precise location of each environment tag within the first storage unit.

7. The system of claim 1, wherein the facility is a shipping sorting center, a logistics store, or a logistics vehicle.

8. A computer-implemented method comprising:
receiving an indication that one or more reader devices have received or read data from a target tag that is coupled to a target asset, wherein the one or more reader devices and the target tag are located in a facility;
receiving a second indication that a plurality of environment tags has provided other data to the one or more reader devices, wherein a first set of environment tags of the plurality of environment tags is coupled to a first storage unit within the facility, and a second set of environment tags of the plurality of environment tags is coupled to a second storage unit within the facility;
predicting that the target asset is within the first storage unit based at least in part on at least one reader device, of the one or more reader devices, mapped to the first storage unit that has received or read the data from the target tag;
predicting a specific location within the first storage unit that the target asset is within based at least in part on comparing one or more indications of signal strength values between the at least one reader device and each environment tag of the first set of environment tags with one or more other indications of signal strength values between the at least one reader device and the target tag.

9. The method of claim 8, further comprising predicting a geographical area that the target asset is located in within the facility based at least in part on an identification of the one or more reader devices receiving the data from the target tag and other reader devices within the facility not receiving the data from the target tag.

10. The method of claim 8, wherein the predicting that the target asset is within the first storage unit includes:
based on one or more mappings, determining which reader devices of the one or more reader devices are assigned to particular storage units within the facility and determining which environment tags of the plurality of environment tags are coupled to the particular storage units; and
based at least in part on the one or more mappings, determining, for each storage unit, a proportion of the set of reader devices mapped to the respective storage unit that has received or read the data from the target tag.

11. The method of claim 10, wherein the predicting that the target asset is within the first storage unit includes predicting that the target asset is within the first storage unit based on the proportion being highest for the first storage unit relative to the second storage unit.

12. The method of claim 8, wherein the predicting of the specific location within the first storage unit that the target asset is within includes representing signal strength indications between each reader device that receives the data from the target tag as a first set of vectors in vector space and representing signal strength indications between each environment tag of the first set of environment tags and the each reader device as a second set of vectors in the vector space and determining a distance between the first set of vectors and the second set of vectors, wherein the distance corresponds to a physical proximity between the each reader device, the target tag, and the each environment tag.

13. The method of claim 12, wherein the predicting of the specific location within the storage unit includes comparing the distance with a configuration file mapping that maps the first storage unit as a multi-dimensional X-coordinate and Y-coordinate grid indicating a precise location of each environment tag within the first storage unit.

14. The method of claim 8, wherein the one or more reader devices, the target tag, and the plurality of environment tags are a part of a Radio Frequency Identification (RFID) system.

15. A computer storage media having computer-executable instructions embodied thereon that, when executed, by a processor, causes the processor to perform a method, the method comprising:
generating one or more mappings that indicate: which set of reader devices of a plurality of reader devices is assigned to one or more storage units of a plurality of storage units within a facility, which set of environment tags of a plurality of environment tags is coupled to the one or more storage units, and a positioning of each environment tag within each storage unit of the one or more storage units;
predicting that a target asset is within a first storage unit based at least in part on a portion of the one or more mappings and further based at least in part on at least one reader device, of the plurality of reader devices, that has received or read data from a target tag; and
predicting a specific location within the first storage unit that the target asset is within based at least in part on another portion of the one or more mappings and further based at least in part on comparing one or more indications of signal strength values between the at least one reader device and at least one environment tag within the first storage unit with one or more other indications of signal strength values between the at least one reader device and the target tag.

16. The computer storage media of claim 15, wherein the predicting that the target asset is within the first storage unit includes based at least in part on a portion of the one or more mappings, determining, for each storage unit, a proportion of the one or more reader devices mapped to the respective storage unit that has received or read the data from the target tag.

17. The computer storage media of claim 16, wherein the predicting that the target asset is within the first storage unit includes predicting that the target asset is within the first storage unit based on the proportion being highest for the first storage unit relative to any other storage unit within the facility.

18. The computer storage media of claim 15, wherein the predicting of the specific location within the first storage unit that the target asset is within includes representing signal strength indications between each reader device that receives the data from the target tag as a first set of vectors in vector space and representing signal strength indications between each environment tag of the set of environment tags that is coupled to the first storage unit and the each reader device as a second set of vectors in the vector space and determining a distance between the first set of vectors and the second set of vectors, wherein the distance corresponds to a physical proximity between the each reader device, the target tag, and the each environment tag.

19. The computer storage media of claim 18, wherein the predicting of the specific location within the first storage unit includes comparing the distance with a portion of the one or more mappings that maps each storage unit as a multi-dimensional X-coordinate and Y-coordinate grid indicating a precise location of each environment tag within the first storage unit.

20. The computer storage media of claim 15, wherein the at least one reader device, of the plurality of reader devices, receiving or reading the data from the target tag occurs continuously according to a particular predefined time window.

* * * * *